(12) United States Patent
Hintermann et al.

(10) Patent No.: US 10,207,261 B2
(45) Date of Patent: Feb. 19, 2019

(54) PHOTO-LATENT TITANIUM CATALYSTS

(75) Inventors: Tobias Hintermann, Therwil (CH); Didier Bauer, Kembs (FR); Antoine Carroy, Limburgerhof (DE); Caroline Lordelot, Mannheim (DE); Rachel Kohli Steck, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/395,467

(22) PCT Filed: Sep. 9, 2010

(86) PCT No.: PCT/EP2010/063198
§ 371 (c)(1),
(2), (4) Date: May 11, 2012

(87) PCT Pub. No.: WO2011/032875
PCT Pub. Date: Mar. 24, 2011

(65) Prior Publication Data
US 2012/0220685 A1  Aug. 30, 2012

(30) Foreign Application Priority Data
Sep. 15, 2009  (EP) .................................... 09170301

(51) Int. Cl.
B01J 31/22 (2006.01)
B01J 31/02 (2006.01)
(Continued)

(52) U.S. Cl.
CPC ....... B01J 31/2234 (2013.01); B01J 31/0208 (2013.01); B01J 31/2213 (2013.01);
(Continued)

(58) Field of Classification Search
CPC ................ B01J 31/2234; B01J 31/0208; B01J 31/2226; B01J 2231/34; B01J 2531/46;
(Continued)

(56) References Cited
U.S. PATENT DOCUMENTS
3,635,906 A * 1/1972 Jayawant ................... 528/58
4,292,252 A   9/1981 Collins et al.
(Continued)

FOREIGN PATENT DOCUMENTS
WO  2006136211  12/2006
WO  2007147851  12/2007
(Continued)

*Primary Examiner* — Rabon A Sergent
(74) *Attorney, Agent, or Firm* — Marshall, Gerstein & Borun LLP

(57) ABSTRACT

The present invention provides a photolatent Ti-chelate catalyst formulation, comprising (i) at least one compound of the formula (I) wherein $R_1$ is $C_1$-$C_{20}$alkyl or $C_2$-$C_{20}$alkyl which is interrupted by one or more non-consecutive O-atoms; Y is formula (II) or optionally substituted phenyl; $Y_1$ is formula (III) or optionally substituted phenyl; $Y_2$ is formula (IV) or optionally substituted phenyl; $Y_3$ is formula (V) or optionally substituted phenyl; $R_2$, $R_3$, $R_4$, $R_5$, $R_6$, $R_7$, $R_8$, $R_9$, $R_{10}$, $R_{11}$, $R_{12}$ and $R_{13}$ independently of each other are hydrogen, halogen, optionally substituted $C_1$-$C_{20}$alkyl, or $R_2$, $R_3$, $R_4$, $R_5$, $R_6$, $R_7$, $R_8$, $R_9$, $R_{10}$, $R_{11}$, $R_{12}$ and $R_{13}$ independently of each other are optionally substituted $C_6$-$C_{14}$aryl, provided that only one of $R_2$, $R_3$, $R_4$ is hydrogen and only one of $R_5$, $R_6$, $R_7$ is hydrogen and only one of $R_8$, $R_9$, $R_{10}$ is hydrogen and only one of $R_{11}$, $R_{12}$, $R_{13}$ is hydrogen; and (ii) at least one chelate ligand compound of the formula IIa, IIb or IIc, wherein Y' is formula (VI) or formula (VII); $Y'_1$ is formula (VIII) or formula (IX); $R'_2$, $R'_3$, $R'_4$, $R'_5$, $R'_6$ and $R'_7$ independently of each other have on of the meanings as given for $R_2$, $R_3$, $R_4$, $R_5$, $R_6$, $R_7$, $R_8$, $R_9$, $R_{10}$, $R_{11}$, $R_{12}$ and $R_{13}$; and $R'_{14}$, $R'_{15}$ and $R'_{16}$ independently of each other have on of the meanings as given for $R_{14}$, $R_{15}$ and $R_{16}$.

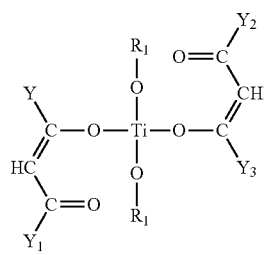

(I)

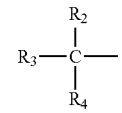

(II)

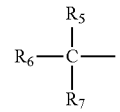

(III)

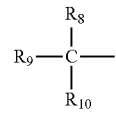

(IV)

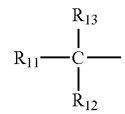

(V)

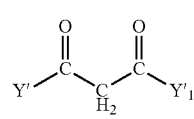

(IIa)

(Continued)

-continued

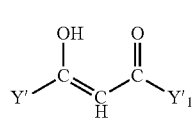
(IIb)

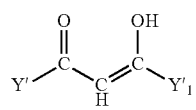

(IIc)

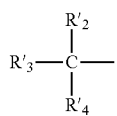

(VI)

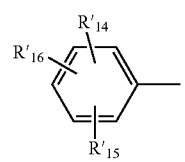

(VII)

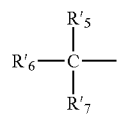

(VIII)

-continued

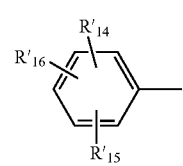
(IX)

12 Claims, No Drawings

(51) Int. Cl.
  *C09D 175/04*  (2006.01)
  *C08G 18/79*  (2006.01)
  *C08G 18/62*  (2006.01)
  *C08G 18/22*  (2006.01)

(52) U.S. Cl.
  CPC ........ *B01J 31/2226* (2013.01); *C08G 18/222* (2013.01); *C08G 18/6216* (2013.01); *C08G 18/792* (2013.01); *C09D 175/04* (2013.01); *B01J 2231/34* (2013.01); *B01J 2531/46* (2013.01)

(58) Field of Classification Search
  CPC .. B01J 31/2213; C09D 175/04; C08G 18/792; C08G 18/6216; C08G 18/222
  USPC ........ 502/171; 522/33, 36, 39, 66, 134, 174; 528/45, 56; 556/51, 54, 55, 56
  See application file for complete search history.

(56) References Cited

U.S. PATENT DOCUMENTS

| | | | |
|---|---|---|---|
| 5,545,600 | A | 8/1996 | Knudsen et al. |
| 6,518,379 | B1 | 2/2003 | Jungling et al. |
| 8,318,830 | B2 * | 11/2012 | Kohli Steck et al. ......... 522/33 |
| 2003/0118725 | A1 | 6/2003 | Shin |
| 2005/0282700 | A1 | 12/2005 | Feldman et al. |
| 2006/0293486 | A1 * | 12/2006 | Emmrich et al. ............... 528/44 |
| 2010/0055474 | A1 | 3/2010 | Bachon et al. |
| 2010/0234485 | A1 | 9/2010 | Lordelot |

FOREIGN PATENT DOCUMENTS

| | | |
|---|---|---|
| WO | 2009/050115 A1 | 4/2009 |
| WO | WO 2009/050115 A1 * | 4/2009 |
| WO | WO-2009/050115 A1 | 4/2009 |

* cited by examiner

PHOTO-LATENT TITANIUM CATALYSTS

The present invention pertains to compositions comprising photolatent titanium catalyst compounds and their application as catalysts in particular for crosslinking 2 pot polyurethane.

It is known in the art to prepare for example polyurethanes (PU) by crosslinking isocyanate components with polyols, including any hydroxyl-functional compounds and also polythiols, in the presence of an organometallic, in particular a tin, catalyst. Corresponding catalysts are known from many publications, for example US2005/0282700, U.S. Pat. No. 5,545,600, U.S. Pat. No. 4,292,252, etc. The same type of organometallic catalyst can also be used in order to catalyze the crosslinking via other condensation or addition reactions, such as for example siloxane modified binders as they are used in silane crosslinking adhesives or sealings, as reported for example in WO2006/136211.

The standard catalysts used today are based on Sn compounds. These catalysts are not latent and thus the reaction between the polyol and the poly-isocyanates is accelerated as soon as the catalyst is added. After a short reaction time (around 0.5 h to 2 h, depending on the concentrations and the conditions), the reaction is completed. This reaction time limits the working window with the resin system after the mixture has been produced.

Thus it is highly desirable to be able to trigger the reaction only on demand through an external activation such as heat or light. This would allow extending the working window with the resins mixture ideally until the external trigger is turned on.

A further problem underlying the invention resides in the legislative pressure on tin catalysts due to the environmental issues raised by these products. A general trend seen in this industry is the replacement of tin catalysts by alternative metals, less or not detrimental to the environment.

Photo-latent catalysts for PU crosslinking have been reported in prior art (e.g. WO2007/147851 and WO2009/050115). These catalysts can be activated by irradiation with UV light. The prior art describes mostly photo-latent tin-catalysts, but also Bi, Zr, Al, and Ti catalysts. Only very few examples of photo-latent Ti catalysts are described. These Ti catalysts do show a nice photo-latent behaviour, however PU formulations containing them provide an insufficient pot-life.

It has now been found that the use of specific combinations of Ti-chelate complexes with an excess (1-50% w/w) of specific chelate ligands leads to a significant improvement of pot-life of the formulation while maintaining a good photo-latency of the catalyst. The addition of only a small amount of specific 1,3-diketones to the photo-latent Ti complexes was surprisingly found to lead to a longer pot-life, but equivalent photolatency compared with the state of the art.

Thus, the present invention resides in a Ti-chelate catalyst formulation, comprising (i) at least one compound of the formula I

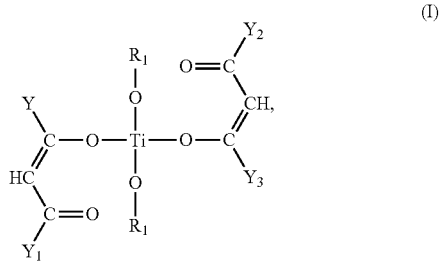

wherein
$R_1$ is $C_1$-$C_{30}$alkyl or $C_2$-$C_{30}$alkyl which is interrupted by one or more non-consecutive O-atoms or $R_1$ is $C_5$-$C_7$cycloalkyl or $C_5$-$C_7$cycloalkyl which is substituted by linear or branched $C_1$-$C_{20}$alkyl;

Y is

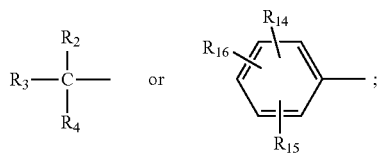

$Y_1$ is

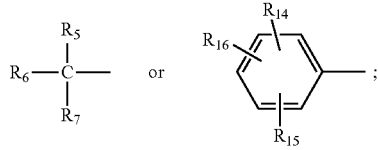

$Y_2$ is

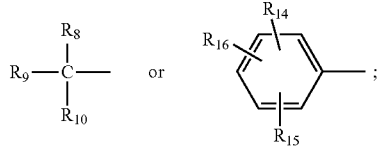

$Y_3$ is

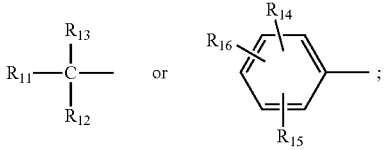

$R_2$, $R_3$, $R_4$, $R_5$, $R_6$, $R_7$, $R_8$, $R_9$, $R_{10}$, $R_{11}$, $R_{12}$ and $R_{13}$ independently of each other are hydrogen, halogen, unsubstituted linear or branched $C_1$-$C_{20}$alkyl, unsubstituted linear or branched $C_2$-$C_{20}$alkyl interrupted by one or more non-consecutive O-atoms, or $R_2$, $R_3$, $R_4$, $R_5$, $R_6$, $R_7$, $R_8$, $R_9$, $R_{10}$, $R_{11}$, $R_{12}$ and $R_{13}$ independently of each other are linear or branched $C_1$-$C_{20}$alkyl which is substituted by halogen, $C_1$-$C_{20}$alkanoyl, $C_2$-$C_{20}$alkanoyloxy, $C_7$-$C_{15}$aroyl, $C_6$-$C_{14}$aroyloxy, $C_1$-$C_{20}$alkoxycarbonyl, nitrile, nitro, $C_1$-$C_{20}$alkylthio, $C_6$-$C_{14}$arylthio, $NR_{17}R_{18}$, unsubstituted $C_6$-$C_{14}$aryl or by $C_6$-$C_{14}$aryl which is substituted by halogen, $C_1$-$C_{20}$alkyl, $C_1$-$C_{20}$alkoxy, phenyl, $C_1$-$C_{20}$alkanoyl, $C_2$-$C_{20}$alkanoyloxy, $C_1$-$C_{20}$alkoxycarbonyl, benzoyl, benzoyloxy, nitrile, nitro, $C_1$-$C_{20}$alkylthio, $C_6$-$C_{14}$arylthio or $NR_{17}R_{18}$, or $R_2$ and $R_3$, and/or $R_5$ and $R_6$, and/or $R_8$ and $R_9$, and/or $R_{11}$ and $R_{12}$ together with the C-atom to which they are attached form a 5 to 7 membered saturated ring, or $R_2$, $R_3$, $R_4$, $R_5$, $R_6$, $R_7$, $R_8$, $R_9$, $R_{10}$, $R_{11}$, $R_{12}$ and $R_{13}$ independently of each other are unsubstituted $C_6$-$C_{14}$aryl or $C_6$-$C_{14}$aryl which is substituted by halogen, $C_1$-$C_{20}$alkyl, $C_1$-$C_{20}$alkoxy, phenyl, $C_1$-$C_{20}$alkanoyl, $C_2$-$C_{20}$alkanoyloxy, benzoyl, benzoyloxy, nitrile, nitro, $C_1$-$C_{20}$alkylthio, $C_6$-$C_{14}$arylthio or $NR_{17}R_{18}$, provided that not more than one of $R_2$, $R_3$, $R_4$ is hydrogen and not more than one of $R_5$, $R_6$, $R_7$ is hydrogen and not more than one of $R_8$, $R_9$, $R_{10}$ is hydrogen and not more than one of $R_{11}$, $R_{12}$, $R_{13}$ is hydrogen;

$R_{14}$, $R_{15}$ and $R_{16}$ independently of each other are hydrogen, halogen, linear or branched $C_1$-$C_{20}$alkyl, $C_1$-$C_{20}$alkoxy, $C_6$-$C_{14}$aryl, $C_1$-$C_{20}$alkanoyl, $C_1$-$C_{20}$alkanoyloxy, $C_1$-$C_{20}$alkoxycarbonyl, $C_7$-$C_{15}$aroyl, $C_7$-$C_{15}$aroyloxy, nitrile, nitro, $C_1$-$C_{20}$alkylthio, $C_6$-$C_{14}$arylthio or $NR_{17}R_{18}$, or $R_{14}$ and $R_{15}$ together with the phenyl ring to which they are attached form thioxanthyl which is unsubstituted or is substituted by $C_1$-$C_4$alkyl;

$R_{17}$ and $R_{18}$ independently of each other are hydrogen, linear or branched $C_1$-$C_{20}$alkyl, benzyl, $C_7$-$C_{15}$aroyl, $C_1$-$C_{20}$alkanoyl, unsubstituted phenyl or phenyl which is substituted by one or more $C_1$-$C_6$alkyl, $C_1$-$C_6$alkoxy or by halogen, or $R_{17}$ and $R_{18}$ together with the N-atom to which they are attached form a 5- or 6-membered saturated or unsaturated ring, which optionally in addition to the N-atom comprises a further N-atom or O-atom and to which ring optionally one or two benzo groups are fused; and (ii) at least one chelate ligand compound of the formula IIa, IIb or IIc

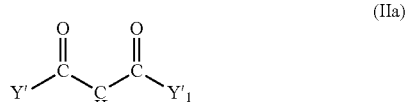
(IIa)

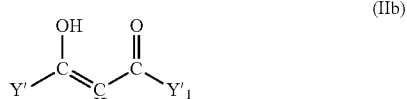
(IIb)

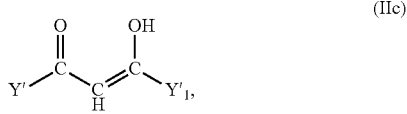
(IIc)

wherein
Y' is

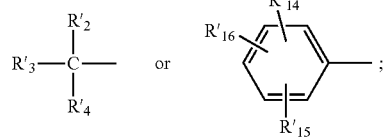

Y'1 is

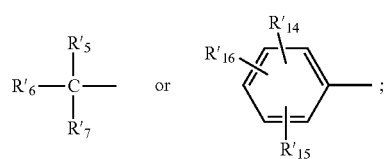

$R'_2$, $R'_3$, $R'_4$, $R'_5$, $R'_6$ and $R'_7$ independently of each other have one of the meanings as given for $R_2$, $R_3$, $R_4$, $R_5$, $R_6$, $R_7$, $R_8$, $R_9$, $R_{10}$, $R_{11}$, $R_{12}$ and $R_{13}$; and $R'_{14}$, $R'_{15}$ and $R'_{16}$ independently of each other have on of the meanings as given for $R_{14}$, $R_{15}$ and $R_{16}$.

$C_1$-$C_{20}$alkyl is linear or branched or cyclic and is, for example, $C_1$-$C_{18}$—, $C_1$-$C_{14}$—, $C_1$-$C_{12}$—, $C_1$-$C_8$—, $C_1$-$C_6$- or $C_1$-$C_4$alkyl. Examples are methyl, ethyl, propyl, isopropyl, n-butyl, secbutyl, isobutyl, tert-butyl, pentyl, e.g. cyclopentyl, hexyl, e.g. cyclohexyl, heptyl, 2,4,4-trimethylpentyl, 2-ethylhexyl, octyl, nonyl, decyl, dodecyl, tetradecyl, pentadecyl, hexadecyl, octadecyl and icosyl, preferably methyl, ethyl, propyl, isopropyl, n-butyl, secbutyl, isobutyl, tert-butyl.

$C_1$-$C_{18}$alkyl, $C_1$-$C_{14}$alkyl, $C_1$-$C_{12}$alkyl, $C_1$-$C_8$alkyl, $C_1$-$C_6$alkyl and $C_{1-4}$alkyl have the same meanings as given above for $C_1$-$C_{20}$alkyl up to the corresponding number of C-atoms.

$C_2$-$C_{20}$alkyl interrupted by one or more O is for example interrupted 1-9, 1-7, 1-6, 1-3 or once or twice by O. The interrupted $C_2$-$C_{20}$alkyl, is linear or branched and is for example interrupted $C_2$-$C_{12}$—, $C_2$-$C_{10}$—, $C_2$-$C_8$—, $C_4$-$C_{20}$—, $C_4$-$C_{12}$- or $C_2$-$C_{18}$alkyl. In case the groups are interrupted by more than one O, said O-atoms are separated from one another by at least one methylene group, i.e. the O-atoms are non-consecutive. Examples are the following structural units —$CH_2$—O—$CH_3$, —$CH_2CH_2$—O—$CH_2CH_3$, —[$CH_2CH_2$O]$_y$—$CH_3$, with y=1-9, —($CH_2CH_2$O)$_7CH_2CH_3$, —$CH_2$—$CH(CH_3)$—O—$CH_2$—$CH_2CH_3$, or —$CH_2$—$CH(CH_3)$—O—$CH_2CH_3$.

$C_6$-$C_{14}$aryl is for example phenyl, naphthyl, anthryl or phenanthryl, in particular phenyl or naphthyl, preferably phenyl.

$C_6$-$C_{14}$aryl which is substituted by one or more $R'_2$, $R'_3$ or $R'_4$ is for example substituted 1-5 times, e.g. 1-4, times or one, twice or three times with $R'_2$, $R'_3$ or $R'_4$. The substituents are for example bound in the 2,4,6-, 2,6-, 2,4-, 2,5-, 2,3,4-, 2-, 4- or 5-position of the phenyl ring.

$C_1$-$C_{12}$alkylene is linear or branched alkylene, for example methylene, ethylene, propylene, 1-methylethylene 1,2-dimethylethylene, 1,1,2,2-tetramethylethylene 1,4-dimethylbutylene, 1,3-dimethylpropylene, butylene, 1-methylpropylene, 2-methylpropylene, pentylene, hexylene, heptylene, octylene, nonylene, decylene or dodecylene, in particular ethylene, propylene 1,2-dimethylethylene, 1,1,2,2-tetramethylethylene, 1,4-dimethylbutylene or 1,3-dimethylpropylene.

Halogen denotes a fluoro, chloro, bromo or iodo radical, especially fluoro, chloro or bromo, in particular chloro and bromo.

$C_1$-$C_{20}$-alkoxy is linear or branched and is for example $C_1$-$C_6$—, $C_1$-$C_2$—, $C_1$-$C_8$—, $C_1$-$C_6$— or $C_1$-$C_4$-alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy, dodecyloxy, hexadecyloxy, octadecyloxy or icosyloxy, in particular methoxy, ethoxy, propoxy, isopropoxy, n-butyloxy, sec-butyloxy, iso-butyloxy, tert-butyloxy, especially methoxy.

$C_1$-$C_{20}$alkanoyl is linear or branched and is, for example, $C_1$-$C_8$—, $C_1$-$C_4$—, $C_1$-$C_2$—, $C_1$-$C_8$—, $C_1$-$C_6$- or $C_1$-$C_4$alkanoyl or $C_4$-$C_{12}$— or $C_4$-$C_8$alkanoyl. Examples are formyl, acetyl, propionyl, butanoyl, isobutanoyl, pentanoyl, hexanoyl, heptanoyl, octanoyl, nonanoyl, decanoyl, dodecanoyl, tetradecanoyl, pentadecanoyl, hexadecanoyl, octadecanoyl, icosanoyl, preferably acetyl.

$C_2$-$C_{20}$alkanoyloxy is linear or branched, and is for example $C_2$-$C_{12}$—, $C_2$-$C_6$—, $C_2$-$C_4$-alkynoyloxy. Examples are acetyloxy, propionyloxy, butanoyloxy, isobutanoyloxy, preferably acetyloxy.

$C_7$-$C_{15}$aroyl is $C_6$-$C_{14}$aryl, as defined above, which at the "yl" moiety bears a —CO— group. Examples are benzoyl, naphthoyl, phenanthroyl and anthroyl, especially benzoyl and naphthoyl, in particular benzoyl.

$C_7$-$C_{15}$aroyloxy is $C_6$-$C_{14}$aryl, as defined above, which at the "yl" moiety bears a (CO)O— group. Examples are benzoyloxy, naphthoyloxy, phenanthroyloxy and anthroyloxy, especially benzoyloxy and naphthoyloxy, in particular benzoyloxy.

$C_1$-$C_{20}$alkylthio is $C_1$-$C_{20}$alkyl, which at the "yl" moiety bears a S-atom. $C_1$-$C_{20}$alkyl has the same meanings as given above for $C_1$-$C_{20}$alkyl up to the corresponding number of C-atoms. $C_1$-$C_{20}$alkylthio is linear or branched or cyclic, for example, methylthio ethylthio, propylthio, isopropylthio, n-butylthio, sec-butylthio, isobutylthio, tert-butylthio, in particular methylthio.

$C_6$-$C_{14}$arylthio is $C_6$-$C_{14}$aryl, which at the "yl" moiety bears a S-atom. $C_6$-$C_{14}$aryl has the same meanings as given above for $C_6$-$C_{14}$aryl. Examples are phenylthio, naphthylthio, anthrylthio, phenanthrylthio, in particular phenylthio.

If $R_{17}$ and $R_{18}$ together with the N-atom to which they are attached form a 5- or 6-membered saturated or unsaturated ring, which ring optionally in addition to the N-atom comprises a further N-atom or O-atom, for example pyrrole, pyrrolidine, oxazole, pyridine, 1,3-diazine, 1,2-diazine, piperidine or morpholine rings, in particular morpholine rings, are formed.

If $R_{17}$ and $R_{18}$ together with the N-atom to which they are attached form a 5- or 6-membered saturated or unsaturated ring, which optionally in addition to the N-atom comprises a further N-atom or O-atom and to which ring optionally one or two benzo groups are fused for example a carbazole group is formed.

"photolatent catalyst" refers to a compound, which upon irradiation with light, in particular with light of the wavelengths 150-800 nm, e.g. 200-800 or 200-600 nm, provides an active catalyst.

The terms "and/or" or "or/and" in the present context are meant to express that not only one of the defined alternatives (substituents) may be present, but also several of the defined alternatives (substituents) together, namely mixtures of different alternatives (substituents).

The term "at least" is meant to define one or more than one, for example one or two or three, preferably one or two.

The term "optionally substituted" means that the radical to which it refers is either unsubstituted or substituted.

Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

The term "(meth)acrylate" in the context of the present application is meant to refer to the acrylate as well as to the corresponding methacrylate.

The preferences referring to the latent catalyst compounds in general (and in particular of the formula I, Ia, Ib, Ic and Id) as given hereinbefore, below and in the context of the whole text, are intended not to refer to the compounds as such only, but to all categories of the claims. That is to the compositions, comprising the latent catalyst compounds, as well as the use or process claims in which said compounds are employed.

Interesting are for example a Ti-chelate catalyst formulation as described above, comprising
(i) 50-99% by weight of at least one compound of the formula I as defined in claim 1, and
(ii) 1-50% by weight of at least one chelate ligand compound of the formula IIa, IIb or IIc as defined in claim 1.

The formulations preferably comprise 2-35% (w/w) of the 1,3-diketone of the formula IIa, IIb or IIc [that is the component (ii)] and 98-65% (w/w) of the compound of the formula I [that is the component (i)], in particular 5-30% of the 1,3-diketone of the formula IIa, IIb or IIc [that is the component (ii)] and 95-70% (w/w) of the compound of the formula I [that is the component (i)].

Further interesting is for example a Ti-chelate catalyst formulation as described above, wherein in formula I $R_2$, $R_3$, $R_4$, $R_5$, $R_6$, $R_7$, $R_8$, $R_9$, $R_{10}$, $R_{11}$, $R_{12}$ and $R_{13}$ independently of each other are unsubstituted linear or branched $C_1$-$C_{12}$alkyl, or $C_1$-$C_{12}$alkyl which is substituted by halogen, $C_1$-$C_{12}$alkanoyl, $C_2$-$C_{12}$alkanoyloxy, benzoyl, benzoyloxy, $C_1$-$C_{12}$alkoxycarbonyl, nitrile, nitro, $C_1$-$C_{12}$alkylthio, phenylthio or $NR_{17}R_{18}$, phenyl or by phenyl which is substituted by halogen, $C_1$-$C_{12}$alkyl, $C_1$-$C_{12}$alkoxy, phenyl, $C_1$-$C_{12}$alkanoyl, $C_2$-$C_{12}$alkanoyloxy, $C_1$-$C_{12}$alkoxycarbonyl, benzoyl, benzoyloxy, nitrile, nitro, $C_1$-$C_{12}$alkylthio, phenylthio or by $NR_{17}R_{18}$;

or $R_2$ and $R_3$, and/or $R_5$ and $R_6$, and/or $R_8$ and $R_9$, and/or $R_{11}$ and $R_{12}$ together with the C-atom to which they are attached form a 5 to 7 membered saturated ring; and $R_{14}$, $R_{15}$ and $R_{16}$ independently of each other are hydrogen, halogen, $C_1$-$C_{20}$alkyl, $C_1$-$C_{20}$alkoxy, $C_6$-$C_{14}$aryl, $C_1$-$C_{20}$alkanoyl, $C_1$-$C_{20}$alkanoyloxy, $C_7$-$C_{15}$aroyl, $C_7$-$C_{15}$aroyloxy, $C_1$-$C_{20}$alkoxycarbonyl, nitrile, nitro, $C_1$-$C_{20}$alkylthio, $C_6$-$C_{14}$arylthio or $NR_{17}R_{18}$, or $R_{14}$ and $R_{15}$ together with the phenyl ring to which they are attached form thioxanthyl which is unsubstituted or is substituted by $C_{1-4}$alkyl;

and in formula IIa, IIb or IIc $R'_2$, $R'_3$, $R'_4$, $R'_5$, $R'_6$ and $R'_7$ independently of each other are hydrogen, halogen, unsubstituted linear or branched $C_1$-$C_{12}$alkyl, linear or branched $C_1$-$C_{20}$alkyl which is substituted by halogen, $C_1$-$C_{12}$alkanoyl, $C_2$-$C_{12}$alkanoyloxy, benzoyl, benzoyloxy, $C_1$-$C_{12}$alkoxycarbonyl, nitrile, nitro, $C_1$-$C_{12}$alkylthio, phenylthio, $NR_{17}R_{18}$, phenyl or by phenyl which is substituted by halogen, $C_1$-$C_{12}$alkyl, $C_1$-$C_{12}$alkoxy, phenyl, $C_1$-$C_{12}$alkanoyl, $C_2$-$C_{12}$alkanoyloxy, $C_1$-$C_{12}$alkoxycarbonyl, benzoyl, benzoyloxy, nitrile, nitro, $C_1$-$C_{12}$alkylthio, phenylthio or by $NR_{17}R_{18}$;

or R'$_2$ and R'$_3$, and/or R'$_5$ and R'$_6$, together with the C-atom to which they are attached form a 5 to 7 membered saturated ring; and R'$_{14}$, R'$_{15}$ and R'$_{16}$ independently of each other are hydrogen, halogen, C$_1$-C$_{12}$alkyl, C$_1$-C$_{12}$alkoxy, phenyl, C$_1$-C$_{12}$alkanoyl, C$_1$-C$_{12}$alkanoyloxy, benzoyl, benzoyloxy, C$_1$-C$_{12}$alkoxycarbonyl, nitrile, nitro, C$_1$-C$_{12}$alkylthio, phenyl or NR$_{17}$R$_{18}$, or R$_{14}$ and R$_{15}$ together with the phenyl ring to which they are attached form thioxanthyl which is unsubstituted or is substituted by C$_{1-4}$alkyl.

Thus, of interest as component (i) in the formulation according to the invention are for example compounds of the formula Ia and Ib

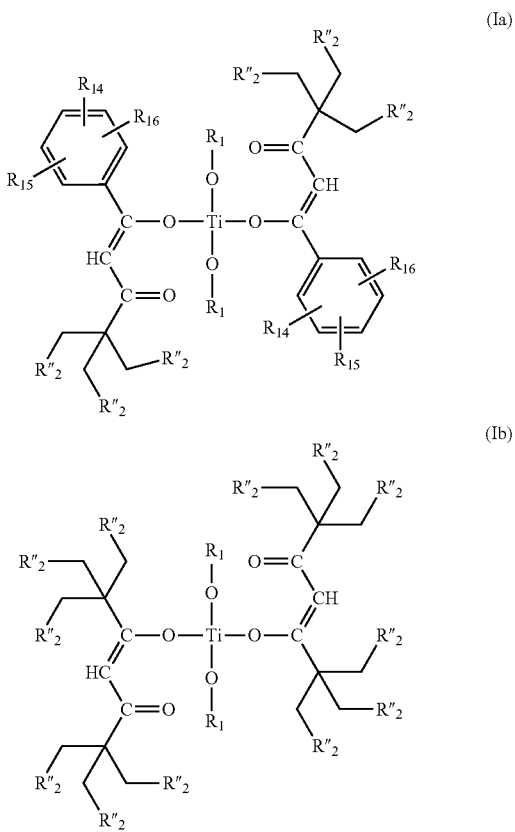

R$_1$ is C$_1$-C$_{20}$alkyl;

R"$_2$ independently of each other are hydrogen, unsubstituted C$_1$-C$_{18}$alkyl, C$_1$-C$_{18}$alkyl which is substituted by halogen, C$_1$-C$_{20}$alkanoyl, C$_2$-C$_{20}$alkanoyloxy, C$_7$-C$_{15}$aroyl, C$_6$-C$_{14}$aroyloxy, C$_1$-C$_{20}$alkoxycarbonyl, nitrile, nitro, C$_1$-C$_{20}$alkylthio, C$_6$-C$_{14}$arylthio, NR$_{17}$R$_{18}$, C$_6$-C$_{14}$aryl or by C$_6$-C$_{14}$aryl which is substituted by halogen, C$_1$-C$_{20}$alkyl, C$_1$-C$_{20}$alkoxy, phenyl, C$_1$-C$_{20}$alkanoyl, C$_2$-C$_{20}$alkanoyloxy, benzoyl, benzoyloxy, nitrile, nitro, C$_1$-C$_{20}$alkylthio, C$_6$-C$_{14}$arylthio or by NR$_{17}$R$_{18}$;

R$_{14}$, R$_{15}$, R$_{16}$, R$_{17}$ and R$_{18}$, are as defined above.

Preferred formulations comprise compounds, wherein

R$_1$ is C$_1$-C$_8$alkyl or C$_2$-C$_{12}$alkyl, which is interrupted by 1-6 non-consecutive O-atoms;

R$_2$, R$_3$, R$_4$, R$_5$, R$_6$, R$_7$, R$_8$, R$_9$, R$_{10}$, R$_{11}$, R$_{12}$ and R$_{13}$ independently of each other are hydrogen, halogen, or C$_1$-C$_4$alkyl, provided that only one of R$_2$, R$_3$, R$_4$ is hydrogen and only one of R$_5$, R$_6$, R$_7$ is hydrogen and only one of R$_8$, R$_9$, R$_{10}$ is hydrogen and only one of R$_{11}$, R$_{12}$, R$_{13}$ is hydrogen;

or R$_5$ and R$_6$, and/or R$_8$ and R$_9$, together with the C-atom to which they are attached form a 5 or 6 membered saturated ring, R$_{14}$, R$_{15}$ and R$_{16}$ independently of each other are hydrogen, C$_1$-C$_4$alkyl, C$_1$-C$_4$alkoxy, benzoyl, nitro or NR$_{17}$R$_{18}$;

or R$_{14}$ and R$_{15}$ together with the phenyl ring to which they are attached form thioxanthyl which is unsubstituted or is substituted by C$_1$-C$_4$alkyl;

R$_{17}$ and R$_{18}$ are C$_1$-C$_4$alkyl;

R'$_2$, R'$_3$, R'$_4$, R'$_5$, R'$_6$ and R'$_7$ independently of each other are hydrogen, halogen, linear or branched C$_1$-C$_4$alkyl; or R$_5$ and R$_6$, together with the C-atom to which they are attached form a 5 or 6 membered saturated ring; and R'$_{14}$, R'$_{15}$ and R'$_{16}$ independently of each other have one of the meanings as given for R$_{14}$, R$_{15}$, and R$_{16}$.

Other interesting formulations for example comprise compounds, wherein in formula I R$_2$, R$_3$, R$_4$, R$_5$, R$_6$, R$_7$, R$_8$, R$_9$, R$_{10}$, R$_{11}$, R$_{12}$ and R$_{13}$ independently of each other are unsubstituted C$_1$-C$_{20}$alkyl; and R$_{14}$, R$_{15}$ and R$_{16}$ are hydrogen;

and in formula IIa, IIb or IIc

R'$_2$, R'$_3$, R'$_4$, R'$_5$, R'$_6$ and R'$_7$ independently of each other are hydrogen, F, C$_1$-C$_{20}$alkyl;

and R'$_{14}$, R'$_{15}$ and R'$_{16}$ are hydrogen.

Interesting also are formulations wherein the compounds of the formula I, IIa, IIb and IIc R'$_2$, R'$_3$, R'$_4$, R'$_5$, R'$_6$ and R'$_7$ independently of each other are hydrogen, halogen, unsubstituted linear or branched C$_1$-C$_{18}$alkyl, C$_1$-C$_{18}$alkyl which is substituted by halogen, C$_1$-C$_{12}$alkanoyl, C$_2$-C$_{20}$alkanoyloxy, benzoyl, benzoyloxy, C$_1$-C$_{12}$alkoxycarbonyl, nitrile, nitro, C$_1$-C$_{12}$alkylthio, phenylthio, NR$_{17}$R$_{18}$, or by phenyl, or R'$_2$, R'$_3$, R'$_4$, R'$_5$, R'$_6$ and R'$_7$ independently of each other are unsubstituted phenyl or phenyl which is substituted by halogen, C$_1$-C$_{12}$alkyl, C$_1$-C$_{12}$alkoxy or by phenyl;

R'$_{14}$, R'$_{15}$ and R'$_{16}$ independently of each other hydrogen, halogen, linear or branched C$_1$-C$_{12}$alkoxy, phenyl, C$_1$-C$_{12}$alkanoyl, C$_1$-C$_{12}$alkanoyloxy, benzoyl, benzoyloxy, nitrile, nitro, C$_1$-C$_{12}$alkylthio, phenylthio or NR$_{17}$R$_{18}$, or R$_{14}$ and R$_{15}$ together with the phenyl ring to which they are attached form thioxanthyl which is unsubstituted or is substituted by C$_1$-C$_4$alkyl.

In other interesting formulations
Y is $$R_3 \!-\! \underset{\underset{R_4}{|}}{\overset{\overset{R_2}{|}}{C}} \!-\! ;$$

Y$_1$ is

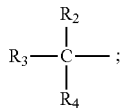

Y$_2$ is

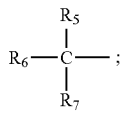

$Y_3$ is

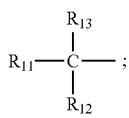

$R_2$, $R_3$, $R_4$, $R_5$, $R_6$, $R_7$, $R_8$, $R_9$, $R_{10}$, $R_{11}$, $R_{12}$ and $R_{13}$ independently of each other are, unsubstituted linear or branched $C_1$-$C_{20}$alkyl, or linear or branched $C_1$-$C_{20}$alkyl which is substituted by halogen, $C_1$-$C_{20}$alkanoyl, $C_2$-$C_{20}$alkanoyloxy, $C_7$-$C_{15}$aroyl, $C_6$-$C_{14}$aroyloxy, $C_1$-$C_{20}$alkoxycarbonyl, nitrile, nitro, $C_1$-$C_{20}$alkylthio, $C_6$-$C_{14}$arylthio, $NR_{17}R_{18}$, or by $C_6$-$C_{14}$ aryl;

or $R_2$ and $R_3$, and/or $R_5$ and $R_6$, and/or $R_8$ and $R_9$, and/or $R_{11}$ and $R_{12}$ together with the C-atom to which they are attached form a 5 to 7 membered saturated ring.

Thus, of interest as component (i) in the formulation according to the invention are for example compounds of the formula Ic and Id

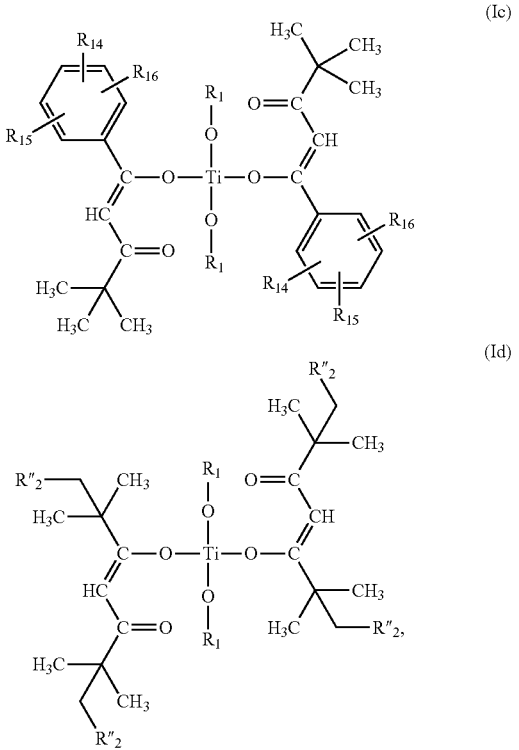

wherein $R_1$, $R''_2$, $R_{14}$, $R_{16}$ and $R_{15}$ are as defined above.

$R_1$ is for example $C_1$-$C_{20}$alkyl or $C_2$-$C_{20}$alkyl which is interrupted by one or more non-consecutive O-atoms; or $R_1$ is for example $C_1$-$C_{20}$alkyl or $C_2$-$C_{20}$ alkyl which is interrupted by 1-6, in particular 1-3 non-consecutive O-atoms; or $R_1$ is for example $C_1$-$C_{12}$alkyl or $C_2$-$C_{12}$alkyl which is interrupted by 1-6, in particular 1-3 non-consecutive O-atoms; or $R_1$ is for example $C_1$-$C_{12}$alkyl.

$R_2$, $R_5$, $R_8$ and $R_{11}$ for example independently of each other are hydrogen, unsubstituted $C_1$-$C_{12}$alkyl, or $C_1$-$C_{12}$alkyl which is substituted by phenyl or by phenyl which is substituted by halogen, $C_1$-$C_{12}$alkyl, $C_1$-$C_{12}$alkoxy, phenyl, $C_1$-$C_2$alkanoyl, $C_2$-$C_{12}$alkanoyloxy, benzoyl, benzoyloxy, nitrile, nitro, $C_1$-$C_{12}$alkylthio, phenylthio or $NR_{17}R_{18}$, or $R_2$, $R_3$, $R_4$, $R_5$, $R_6$, $R_7$, $R_8$, $R_9$, $R_{10}$, $R_{11}$, $R_{12}$ and $R_{13}$ independently of each other are unsubstituted phenyl or naphthyl or phenyl or naphthyl both of which are substituted by halogen, $C_1$-$C_{12}$alkyl, $C_1$-$C_{12}$alkoxy, phenyl, $C_1$-$C_{20}$alkanoyl, $C_2$-$C_{20}$alkanoyloxy, benzoyl, benzoyloxy, nitrile, nitro, $C_1$-$C_{12}$alkylthio, phenylthio or $NR_{17}R_{18}$; or $R_2$, $R_5$, $R_8$ and $R_{11}$, for example independently of each other are unsubstituted $C_1$-$C_{12}$alkyl, or $C_1$-$C_{12}$alkyl which is substituted by phenyl; or $R_2$, $R_5$, $R_8$ and $R_9$ for example independently of each other are unsubstituted $C_1$-$C_{12}$alkyl;

or $R_2$ and $R_3$, and/or $R_5$ and $R_6$, and/or $R_8$ and $R_9$, and/or $R_{u1}$ and $R_{12}$ together with the C-atom to which they are attached form a 5 to 7 membered saturated ring.

$R_3$, $R_4$, $R_5$, $R_7$, $R_9$, $R_{10}$, $R_{12}$ and $R_{13}$ for example independently of each other are hydrogen, unsubstituted $C_1$-$C_{12}$alkyl, or $C_1$-$C_{12}$alkyl which is substituted by phenyl or by phenyl which is substituted by halogen, $C_1$-$C_{12}$alkyl, $C_1$-$C_{12}$alkoxy, phenyl, $C_1$-$C_2$alkanoyl, $C_2$-$C_{12}$alkanoyloxy, benzoyl, benzoyloxy, nitrile, nitro, $C_1$-$C_{12}$alkylthio, phenylthio or $NR_{17}R_{18}$, or $R_3$, $R_4$, $R_6$, $R_7$, $R_9$, $R_{10}$, $R_{12}$ and $R_{13}$ independently of each other are unsubstituted phenyl or naphthyl or phenyl or naphthyl both of which are substituted by halogen, $C_1$-$C_{12}$alkyl, $C_1$-$C_{12}$alkoxy, phenyl, $C_1$-$C_{20}$alkanoyl, $C_2$-$C_{20}$alkanoyloxy, benzoyl, benzoyloxy, nitrile, nitro, $C_1$-$C_{12}$alkylthio, phenylthio or $NR_{17}R_{18}$; or $R_3$, $R_4$, $R_6$, $R_7$, $R_9$, $R_{10}$, $R_{12}$ and $R_{13}$ for example independently of each other are unsubstituted $C_1$-$C_{12}$alkyl, or $C_1$-$C_{12}$alkyl which is substituted by phenyl; or $R_3$, $R_4$, $R_6$, $R_7$, $R_9$, $R_{10}$, $R_{12}$ and $R_{13}$ for example independently of each other are unsubstituted $C_1$-$C_{12}$alkyl;

or $R_2$ and $R_3$, and/or $R_5$ and $R_6$, and/or $R_8$ and $R_9$, and/or $R_{u1}$ and $R_{12}$ together with the C-atom to which they are attached form a 5 to 7 membered saturated ring, $R_{14}$, $R_{15}$ and $R_{16}$ for example independently of each other hydrogen, halogen, $C_1$-$C_{12}$alkyl, $C_1$-$C_2$alkoxy, phenyl, naphthyl, $C_1$-$C_{12}$alkanoyl, $C_2$-$C_{12}$alkanoyloxy, benzoyl, benzoyloxy, nitrile, nitro, $C_1$-$C_{12}$alkylthio, phenylthio or $NR_{17}R_{18}$; or $R_{14}$ and $R_{15}$ together with the phenyl ring to which they are attached form thioxanthyl which is unsubstituted or is substituted by $C_1$-$C_4$alkyl.

Or $R_{14}$, $R_{15}$ and $R_{16}$ for example independently of each other hydrogen, $C_1$-$C_{12}$alkyl, $C_1$-$C_2$alkoxy or $NR_{17}R_{18}$; or $R_{14}$, $R_{15}$ and $R_{16}$ for example independently of each other hydrogen, $C_1$-$C_{12}$alkyl, $C_1$-$C_2$alkoxy or $NR_{17}R_{18}$; or $R_{14}$, $R_{15}$ and $R_{16}$ for example independently of each other hydrogen, $C_1$-$C_2$alkoxy or $NR_{17}R_{18}$.

$R_{17}$ and $R_{18}$ for example independently of each other are hydrogen, $C_1$-$C_{20}$alkyl, phenyl, benzyl or $R_8$ and $R_9$ together with the N-atom to which they are attached form a 5- or 6-membered saturated or unsaturated ring, which optionally in addition to the N-atom comprises a further N-atom or O-atom; or $R_{17}$ and $R_{18}$ for example independently of each other are hydrogen, $C_1$-$C_{12}$alkyl, phenyl, benzyl or $R_8$ and $R_9$ together with the N-atom to which they are attached form a 5- or 6-membered saturated ring, which optionally in addition to the N-atom comprises a further N-atom or O-atom; or $R_{17}$ and $R_{18}$ for example independently of each other are hydrogen, $C_1$-$C_{12}$alkyl, or $R_8$ and $R_9$ together with the N-atom to which they are attached form a morpholino ring; in particular $R_8$ and $R_8$ are $C_1$-$C_4$alkyl, for example methyl.

The preferences given above for $R_2$, $R_3$, $R_4$, $R_5$, $R_6$ and $R_7$ also apply for the radicals $R'_2$, $R'_3$, $R'_4$, $R'_5$, $R'_6$ and $R'_7$.

The preferences given above for $R_{14}$, $R_{15}$ and $R_{16}$ also apply for the radicals $R'_{14}$, $R'_{14}$ and $R'_{16}$.
In particular interesting compounds of the formula I to be used in the present Ti-catalyst formulation are for example the ones as given in the examples below.
In particular interesting compounds of the formula I are selected from the group consisting of
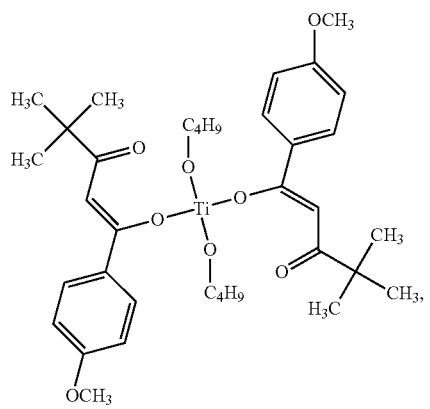
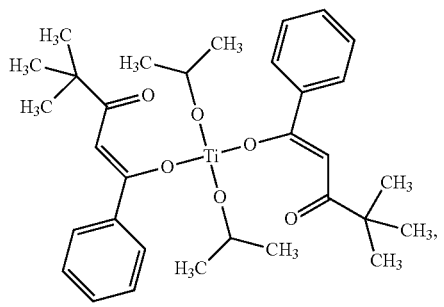
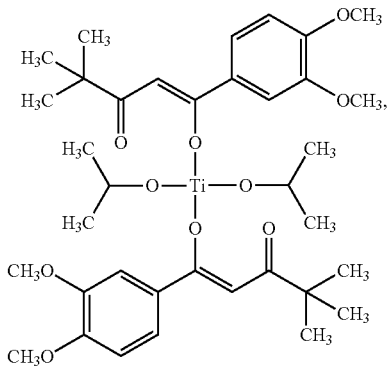
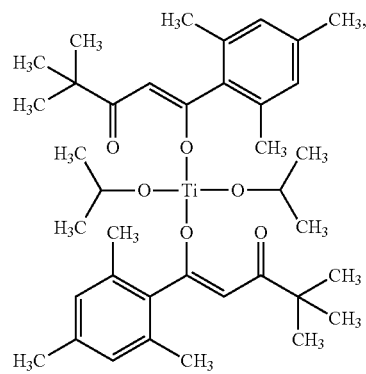
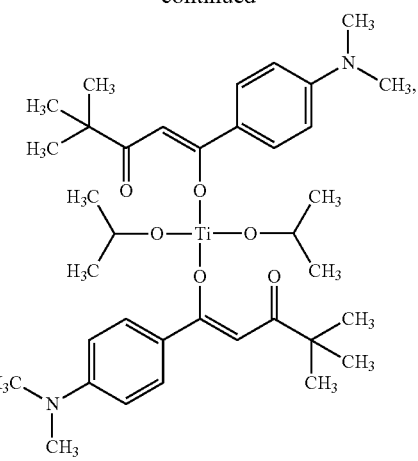
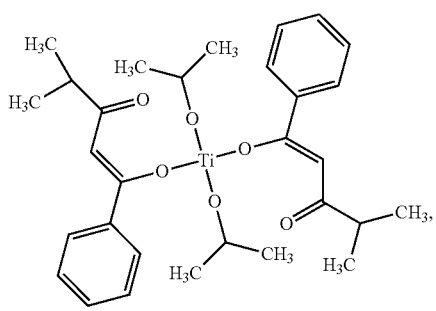
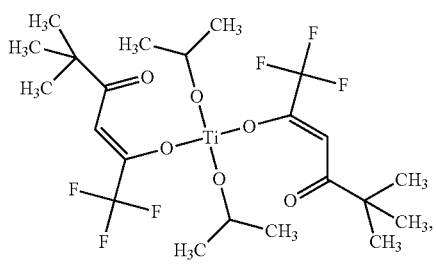
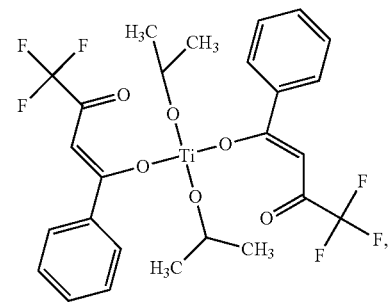
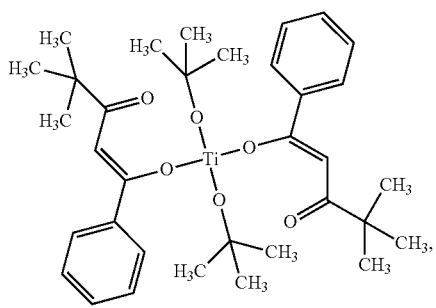

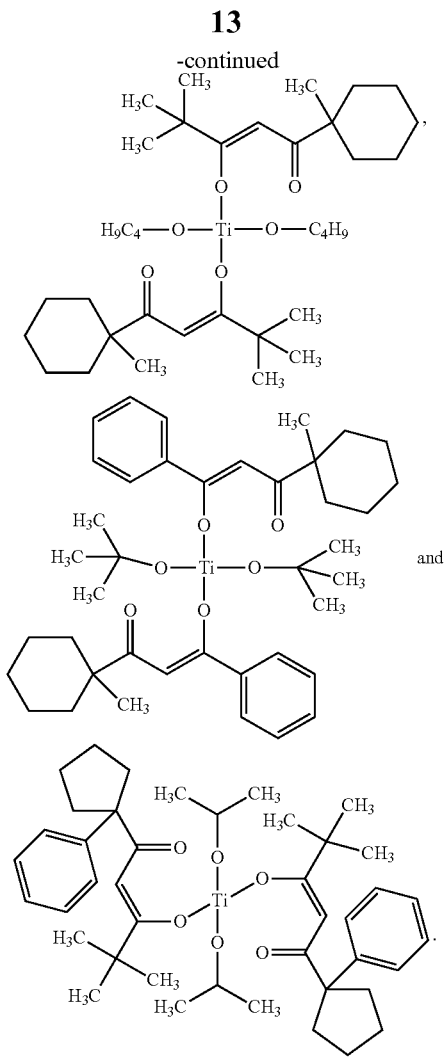

Subject of the invention further are the Ti-chelate catalyst compounds of the formula (Ix)

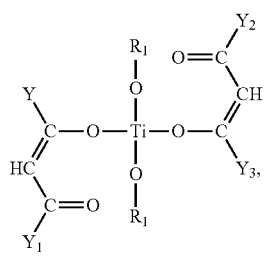

(Ix)

wherein $R_1$ is $C_2$-$C_{30}$alkyl which is interrupted by one or more non-consecutive O-atoms or $R_1$ is $C_5$-$C_7$cycloalkyl or $C_5$-$C_7$cycloalkyl which is substituted by linear or branched $C_1$-$C_{20}$alkyl and Y, $Y_1$, $Y_2$ and $Y_3$ are as defined above.

The compounds of the formula I (and the formula (Ix) respectively) of the present invention can be prepared by known methods, e.g. by ligand exchange reactions from commercially available Ti(IV)-alkoxide compounds with 2 equivalents of 1,3-diketones, as for example described in WO2009/050115

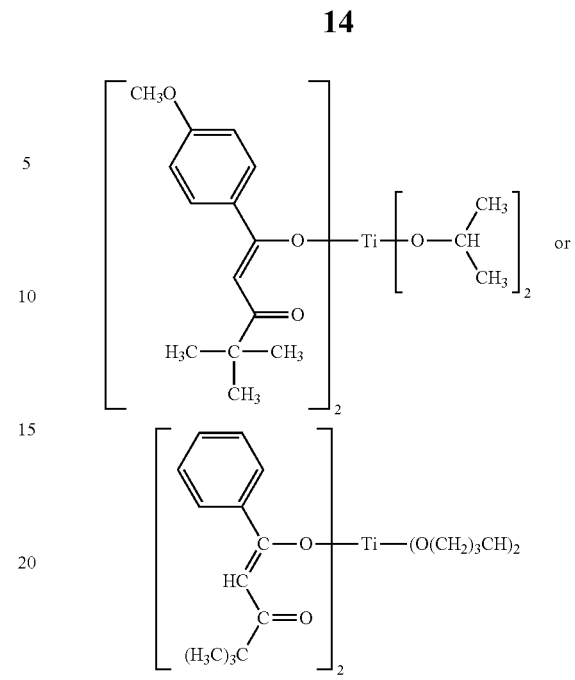

(see examples 57 and 55 of WO2009/050115). The ligand exchange reaction takes place spontaneously and the alcohol is replaced by the 1,3-diketone. The liberated alcohol may be removed azeotropically.

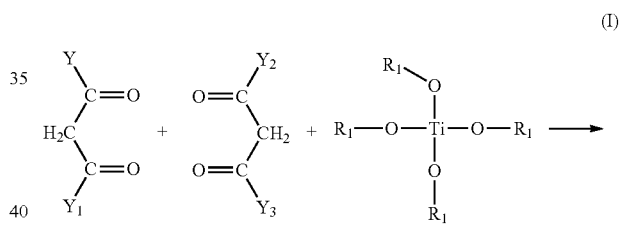

(I)

The definitions of $R_1$, Y, $Y_1$, $Y_2$, and $Y_3$ are given as above.

The compounds may also be prepared by reacting Ti(IV) tetrachloride first with two equivalents of 1,3-diketone and then with two equivalents of alcohol.

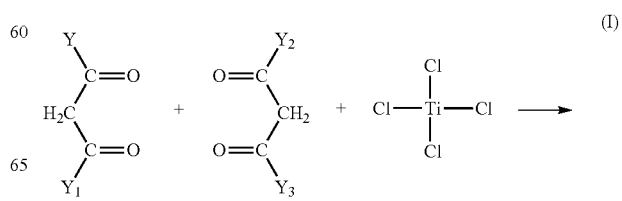

(I)

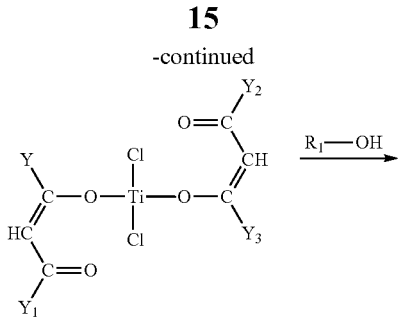

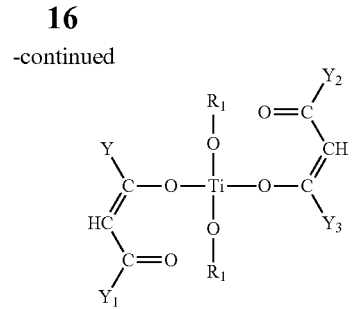

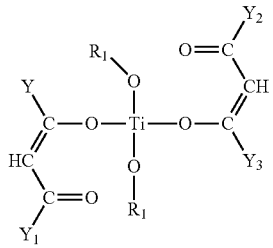

Or by reaction of a Ti(IV) dichloro-dialkoxide with 2 equivalents of the 1,3-diketone.

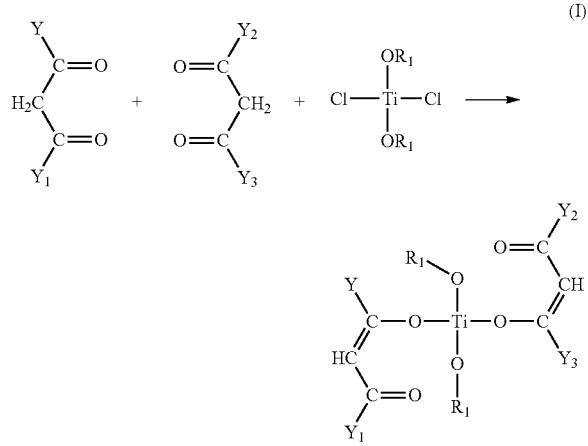

The definitions of $R_1$, Y, $Y_1$, $Y_2$, and $Y_3$ are given as above.

The compounds according to the present invention can in addition also be prepared from these compounds (or similar compounds with the corresponding substituents) by replacement of the alcoholate ligand, reacting them with an excess of the appropriate alcohols. The person skilled in the art is familiar with such reactions and the conditions therefor.

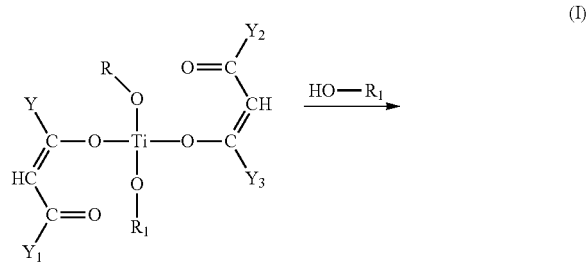

The definitions of $R_1$, Y, $Y_1$, $Y_2$, and $Y_3$ are given as above. The definition for R is as for $R_1$.

The person skilled in the art is familiar with conditions and precautions which have to be taken in such organometallic reactions.

It is, for example, advantageous to work under an inert reaction atmosphere as in principle the organometallic intermediates (metal alkoxides, metal enolates, etc.) are very sensitive to moisture. Accordingly, the reaction advantageously is conducted under nitrogen or argon gas flow by advantageously inertizing the corresponding reaction apparatus prior to the reaction by the usual methods, for example by heating followed by evacuation.

In the isolation and working-up of the products of the present invention, it is also necessary to take corresponding appropriate precautions, depending on the stability against moisture and oxygen.

Suitable solvents in the preparation processes for the compounds according to the present invention are for example water free aprotic solvents, in particular toluene, xylene, hexane, cyclohexane, dichloromethane, dioxane and tetrahydrofurane (THF) or the alcohol $R_1$—OH. The reaction may also be carried out without using a solvent.

The reaction temperature range for example from −20° C. up to about 200° C., or 0° C. to 150° C., preferably room temperature to 80° C.

The pressure for example ranges from normal pressure (760 Torr) to 1 mmHg, preferably normal pressure or a slight vacuum is used.

Several compounds, that may be used as intermediates in the above reactions are commercially available, e.g. Ti-complexes, or are prepared for example as described in WO2009/050115 mentioned above.

The compounds IIa, IIb and IIc (which describe tautomeric forms of one compound) of this invention are commercially available or can be prepared by Claisen condensation of the respective esters or activated carboxylic acids and methylketones, a reaction well known to those skilled in the art. Alternatively they can be prepared by rearrangement of epoxyketones as described by R. Noyori et al. In J. Am. Chem. Soc. 1980, 102, 2095.

Ti-chelate catalyst formulation, comprising compounds of the formula I and compounds of the formula IIa, IIb and IIc is for example formed using different approaches:

i) dissolving a photo-latent catalyst of the formula I in a solvent or part of the formulation to be crosslinked and adding the 1,3-diketone compound of the formula IIa, IIb and IIc to either this solution or to another part of the formulation (or in inverse order);

ii) preparing the Ti-chelate catalyst formulation in advance as a physical mixture of a photo-latent catalyst of the formula I and the 1,3-diketone compound of the formula IIa, IIb and IIc, optionally as a solution in an organic solvent, e.g. xylene or butylacetate, which can be stored (the mixture may be prepared by mixing of the compound of the formula I with the 1,3-diketone, or by addition of the 1,3-diketone during the preparation of the compound of the formula I).

Suitable examples for compounds of the formula IIa, IIb and IIc are for example but not limited to

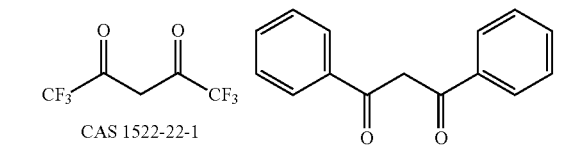
CAS 1522-22-1    CAS 120-46-7

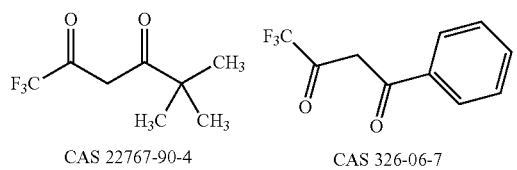
CAS 22767-90-4    CAS 326-06-7

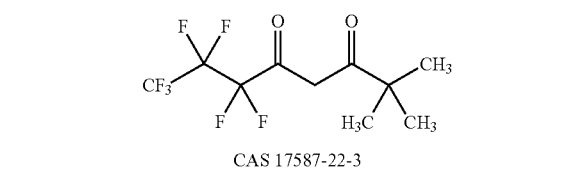
CAS 17587-22-3

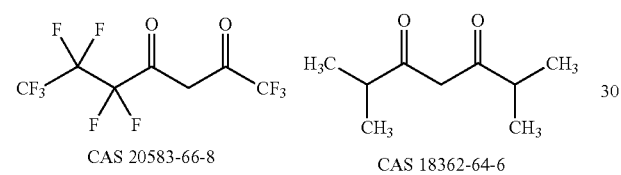
CAS 20583-66-8    CAS 18362-64-6

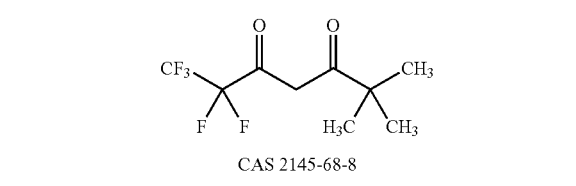
CAS 2145-68-8

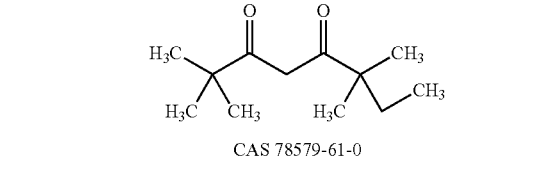
CAS 78579-61-0

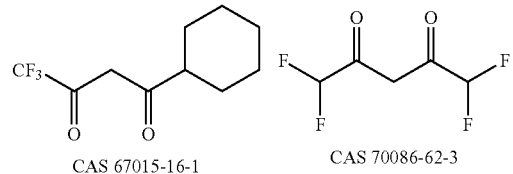
CAS 67015-16-1    CAS 70086-62-3

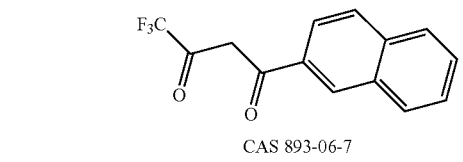
CAS 893-06-7

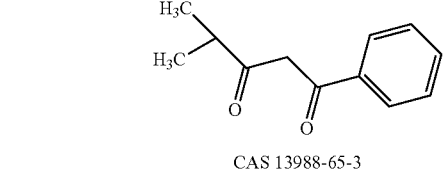
CAS 13988-65-3

-continued

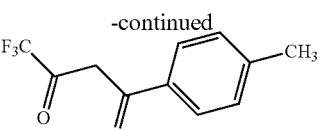
CAS 720-94-5

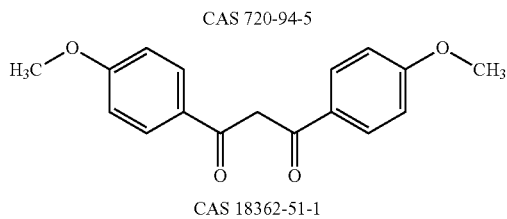
CAS 18362-51-1

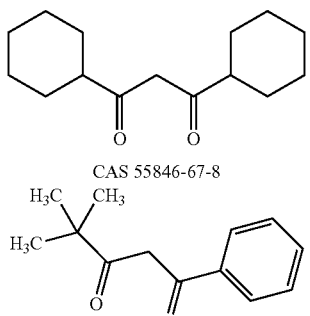
CAS 55846-67-8

CAS 13988-67-5

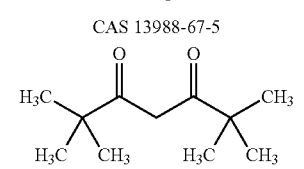
CAS 1118-71-4

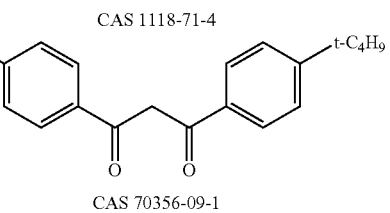
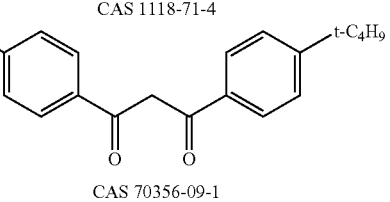
CAS 70356-09-1

The present compositions, and the process for making them crosslinked, are useful as encapsulants, sealants, adhesives, foams, printing plates and coatings, especially transportation (automotive) and industrial coatings. As transportation coatings, the present compositions are useful as both OEM (original equipment manufacturer) and automotive refinish coatings. They may also be used as primer coatings. They often cure under ambient conditions to tough hard coatings and may be used as base coat, intermediate coating and top coat, either clear or pigmented. This makes them particularly useful for repainting of transportation vehicles in the field.

This invention provides (photo)latent compounds as catalysts for polyaddition or polycondensation reactions, that are catalysed by Lewis-acid type reactants. Especially preferred is the reaction of polyols with isocyanates.

Accordingly, subject of the invention also is the use of a Ti-chelate catalyst formulation as described above as a catalyst for polyaddition or polycondensation reactions, that are catalysed by Lewis-acid type reactants, in particular for the crosslinking of a blocked or unblocked isocyanate or isothiocyanate component with a polyol to form a polyurethane (PU); as well as a polymerizable composition comprising (a) at least one blocked or unblocked isocyanate or isothiocyanate, (b) at least one polyol; and (c) at least one Ti-chelate catalyst formulation as described above.

Said polymerizable composition in addition to components (a), (b) and (c) can comprise further additives (d), in particular a photosensitizer compound.

The photopolymerizable compositions generally comprise 0.001 to 15% by weight, e.g. 0.05 to 15% by weight, preferably 0.01 to 5% by weight, most preferably 0.05 to 2.5%, of the Ti-chelate catalyst compound of the formula I, based on the total composition. In other words, the amount as defined above refers to the active catalyst compound, excluding the compounds of the formula IIa, IIb and IIc which are present in the Ti-chelate catalyst formulation as defined above. The amounts are based on the total weight of the composition.

The use of a Ti chelate catalyst for crosslinking of moisture curing silicone elastomers is e.g. described by J.-M. Pujol and C. Prébet in J. Adhesion Sci. Technol. 2003, 17, 261. Curing by crosslinking of silicone compositions is used in many applications such as waterproofing seals in construction (G. M. Lucas in WO02/062893 or T. Detemmerman et al in WO2008/045395), adhesives in structural glazing, gaskets in car engines, adhesives for electronic devices, and antifouling or moisture repellent coatings (H. Kobayashi et al in WO02/098983). Ti chelates can also be used for room-temperature curable organopolysiloxane compositions used e.g. as sealants or coating agents for electric circuits and electrodes (A. Nabeta et al in WO2009/054279), for curing of pressure sensitive adhesives as described by K. Fujimoto and K. Ueda in EP1715015, or for curing of an adhesive composition based on silane and phenolic resin (S. Sano et al in EP1842889). They can also be used for curing of non silicone rubber compositions as described e.g. by T. W. Wilson in WO02/100937. Ti chelate catalysts can also be used for curing of epoxy resins (W. J. Blank et al in Journal of Coatings Technology 2002, 74, 33), e.g. for anhydride epoxy resins as described by J. D. B. Smith in J. Applied Polym. Sci. 1981, 26, 979, or carboxyl epoxy resins used for heat activatable adhesive tapes (T. Krawinkel in WO2008/043660).

Other examples of metal catalyzed crosslinking reactions are for example the reaction of siloxane-terminated oligomers with epoxides used in the fabrication of abrasion and weather resistant coatings (M. Priesch in DE19935471), the reaction of epoxy resins with hydroxyl-terminated poly(dimethyloxysilanes) and an aminopropyltriethoxysilane crosslinker (M. Alagar et al. Eur. Polym. J. 2000, 36, 2449), or the reaction of polyethers terminated by hydrolysable silyl groups with epoxy silanes and ketimines (Y. Murayama, JP06049346) or oximo-ethoxy functional sealants as described by H. M. Haugsby et al in EP399682. The use of room temperature vulcanizing (RTV) siloxane rubbers for biofouling protection is reported by J. M. Delehanty et al, GB2444255. Sol-gel reactions catalysed by a metal catalyst are for example described by J. Mendez-Vivar, J. of Sol-Gel Sci. Technol. 2006, 38(2), 159.

Another subject of the invention is a process for polymerizing compounds, which are capable to crosslink in the presence of a Lewis acid, characterized in that a catalyst formulation according to the invention is added to said compounds and the resulting mixture is irradiated with electromagnetic radiation of a wavelength range of 200-800 nm; in particular a process wherein the component which is capable to crosslink in the presence of a Lewis acid is a mixture of (a) a blocked or unblocked isocyanate or isothiocyanate component and (b) a polyol.

Interesting further is a process as described above, characterized in that instead of irradiating with electromagnetic radiation the mixture is subjected to a heat treatment, or the mixture is irradiated with electromagnetic radiation and simultaneously with or after the irradiation subjected to a heat treatment.

Further subjects of the invention are a process as described above for the preparation of adhesives, coatings, sealings, potting components, printing inks, printing plates, foams, moulding compounds, or photostructured layers, as well as the use of the polymerizable composition as described above for the preparation of adhesives, coatings, sealings, potting components, printing inks, printing plates, foams, moulding compounds, or photostructured layers.

Another subject is a coated substrate coated on at least one surface with a composition as described above and a polymerized or crosslinked composition as described above.

Polyols (component (b)) are generally defined as polymeric or oligomeric organic species with at least two hydroxy functionalities.

Examples of suitable polyols include trimethylol propane, trimethylol ethane, glycerol, 1,2,6-hexanetriol, ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, etc., and mixtures thereof. Suitable polyols also include the more recently developed hyperbranched OH-polymers.

The hydroxyl-functional compound comprising at least two hydroxyl-functional groups may for example also be selected from polyester polyols, polyether polyols, e.g. polyTHF-polyol, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, e.g. HO-functional vinyl oligomers, such as castor oil and trimethylol propane, may be included. Interesting polyols are acrylic and polyester polyols, e.g. the Joncryl® acrylic polyols available from BASF (e.g. Joncryl® 512 or 922), or Setalux® and Setal® products available from Nuplex Resins (e.g. Setalux® 1187 XX-60, Setal® 1606 BA-80), or Desmophen® products from Bayer Material Science (e.g. Desmophen® A VP LS 2350).

In the context of the present invention also polyol components which are suitable in water-borne system such as e.g. waterborne 2K polyurethane, can be employed. Such polyol components are commercially available, for example from BASF under the trademark Joncryl®, e.g. Joncryl® 8311 and also the trademark Luhydran®, e.g. Luhydran® 5938T as well as from Bayer Material Science under the trademark BAYHYDROL®, eg. BAYHYDROL® XP2470.

Suitable isocyanate components (a) are for example isocyanates—with functional groups capable of reacting with hydroxyl- and are structured as follows:

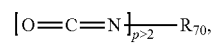

wherein $R_{70}$ is a hydrocarbyl structure.

The organic (poly)isocyanate includes for example polyfunctional, preferably free polyisocyanates, with, for instance, an average NCO functionality of 2.5 to 5, and may be aliphatic, cycloaliphatic, araliphatic or aromatic in nature. Examples are di-, tri- or tetraisocyanates. The polyisocyanate may include biuret, urethane, uretdione, and isocyanurate derivatives. Suitable polyisocyanates include polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanates, etc.

Examples of these organic polyisocyanates include 1,6-diisocyanatohexane, isophorone diisocyanate, 2,4-toluene diisocyanate, 2,6-toluene diisocyanate, diphenyl methanediisocyanate, 4,4'-bis(isocyanato-cyclohexyl)methane, 1,4-diisocyanotobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylen diisocyanate, 1,4-xylylen diisocyanate, 1-isocyanato-3-(isocyanato methyl)-1-methyl cyclohexane, m-α,α-α',α'-tetramethyl xylylene diisocyanate, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega,omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane-4,4'-diisocyanate, a toluene diisocyanate, 1,3-bis(1-isocyanato-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, the above-mentioned derivatives thereof, and mixtures thereof. Further examples are polyisocyanates having isocyanurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (e.g. as available under the trademark Desmodur®N from Bayer Corporation), the adduct of 1 molecule of trimethylol propane and 3 molecules of toluene diisocyanate (available under the trademark Desmodur®L from Bayer Corporation), the adduct of 1 molecule of trimethylol propane and 3 molecules of isophorone diisocyanate, compounds such as 1,3,5-triisocyanatobenzene and 2,4,6-triisocyanatotoluene, and the adduct of 1 molecule of pentaerythritol and 4 molecules of toluene diisocyanate.

A specific example of an isocyanate capable of reacting with hydroxyl groups is the HDI trimer, e.g. Desmodur® 3300 available from Bayer, or Basonat® HI 100 available from BASF. The idealized structure of the latter is given as follows (also, pentamer, heptamer and higher molecular weight species can be present):

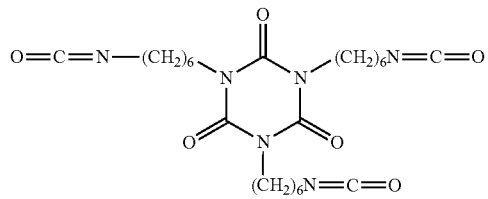

Normally, these products are liquid at ambient temperature and commercially available in a wide range. Particularly preferred isocyanate curing agents are triisocyanates and adducts. Examples thereof are 1,8-diisocyanato-4-(isocyanatomethyl)octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-α,α-α',α'-tetramethyl xylene diisocyanate to 1 mole of trimethylol propane, and mixtures thereof.

In particular interesting are cyclic trimers (isocyanurates) and uretdiones of 1,6-hexane diisocyanate and isophorone diisocyanate. Usually these compounds contain small quantities of their higher homologues.

Optionally, in case the present composition is used as a water borne coating composition, it may also comprise an organic hydrophilic polyisocyanate compound substituted with non-ionic groups, such as $C_1$-$C_4$alkoxy polyalkylene oxide groups. For example 30 wt. % of non-ionic groups will be present on the total solid polyisocyanate compound, e.g. 20 wt. %, preferably 15 wt. %. Ionically stabilized polyisocyanates may also be used.

In any of the compositions herein, the polymeric materials may range from relatively low to relatively high molecular weight. It is preferred that they be of relatively low molecular weight so as to keep the viscosity of the compositions before crosslinking low, so as to avoid or minimize the need for solvent(s).

Other additives (d), which may optionally be present in the compositions include one or more solvents (and are meant to act only as solvents). These preferably do not contain groups such as hydroxyl or primary or secondary amino.

Depending on use, the compositions may contain other materials (d). Examples of ingredients, additives or auxiliaries (d), are pigments, dyes, emulsifiers (surfactants), pigment dispersion aids, levelling agents, anti-cratering agents, antifoaming agents, wetting agents, antisagging agents, heat stabilisers, UV absorbers, antioxidants, desiccants and fillers.

For example, especially when used as encapsulants and sealants, the compositions may contain fillers, pigments, and/or antioxidants.

When used as coatings, the present compositions optionally contain typically added ingredients known in the art, which are described below. For example there may be other polymers (e) (especially of low molecular weight, "functionalized oligomers") which are either inert or have a functional group other than hydroxyl or isocyanate and also react with other reactive materials in the coating composition.

Representative examples of such functionalized oligomers that can be employed as components or potential crosslinking agents of the coatings are the following:

Hydroxyl oligomers: for example the reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like produce acid oligomers. These acid oligomers are further reacted with monofunctional epoxies such as butylene oxide, propylene oxide, and the like to form hydroxyl oligomers.

Silane oligomers: for example the above hydroxyl oligomers further reacted with isocyanato propyltrimethoxy silane.

Epoxy oligomers: for example the diglycidyl ester of cyclohexane dicarboxylic acid, such as for example Araldite®CY-184 from Huntsman, and cycloaliphatic epoxies, such as for example Celloxide 2021 and the like from Daicel, or for example hydroxyl-terminated epoxidized polybutadiene, e.g. Poly bd 600 and 605 from Sartomer. Also suitable as reactive materials are for example oxetane derivatives, e.g. OXT 101 and 121 from Toagosei or TMPO from Perstorp.

Aldimine oligomers: for example the reaction product of isobutyraldehyde with diamines such as isophorone diamine, and the like.

Ketimine oligomers: for example the reaction product of methyl isobutyl ketone with diamines such as isophorone diamine.

Melamine oligomers: for example the commercially available melamines such as CYMEL® 1168 from Cytec Industries, and the like.

AB-functionalized oligomers: for example acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-functionalized crosslinkers: for example epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

Preferred functionalized oligomers have for example a weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25.

Other additives for example also include polyaspartic esters, which are the reaction product of diamines, such as, isopherone diamine with dialkyl maleates, such as, diethyl maleate.

Optionally, a hydroxyl-functional compound comprising at least two hydroxyl-functional groups may be present in the curable material. The hydroxyl-functional compound comprising at least two hydroxyl-functional groups may for example be selected from polyester polyols, polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be included. Interesting polyols are acrylate polyols, e.g. the acrylate polyol Setalux® 1187 available from Nuplex Resins.

Coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate and the like.

The compositions of this invention may additionally contain a binder (e) of a noncyclic oligomer, i.e., one that is linear or aromatic. Such noncyclic oligomers can include, for instance, succinic anhydride- or phthalic anhydride-derived moieties in hydroxyl oligomers and the like.

The compositions of the invention as coating compositions can for example also contain as a binder an acrylic polymer of a weight average molecular weight greater than 3,000, or a conventional polyester such as SCD®-1040 from Etna Product Inc. for improved appearance, sag resistance, flow and leveling and the like. The acrylic polymer is for example composed of typical monomers such as acrylates, methacrylates, styrene and the like and functional monomers such as hydroxy ethyl acrylate, glycidyl methacrylate, or gamma-methacrylylpropyl trimethoxysilane and the like.

The coating compositions for example can also contain a binder (e) of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 µm. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is for example comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

Optionally, for example a ketone based chelating agent (as further additive (d)) may be added to the coating composition. Examples of these chelating agents include alphahydroxyl ketones, fused aromatic beta-hydroxy ketones, dialkyl malonates, aceto acetic esters, alkyl lactates, and alkyl pyruvates. The ketone based chelating agent for example is used in an amount up to 10 wt. % on solids, preferably up to 5 wt. %.

In one embodiment the coating composition additionally comprises a pot life extending agent. A pot life extending agent is particularly beneficial when the photolatent catalyst exhibits a certain degree of catalytic activity also in the latent form. It may also be the case that the photolatent catalyst contains catalytically active impurities which deteriorate the pot life of the composition. Pot life extending agents increase the pot life of the coating composition, i.e. the time between the mixing of all components and the moment when the viscosity becomes too high for the composition to be applied. Pot life extending agents can suitably be present in similar amounts as the photolatent catalysts mentioned above. Preferred pot life extending agents have only a limited or no negative impact on the drying speed of the coating composition, in particular when curing the applied coating at elevated temperature, such as 40 to 60° C. Thus, these pot life extending agents improve the balance of pot life and drying speed. The pot life extending agent can also have a beneficial effect on the appearance of the coating. Examples of suitable pot life extending agents are carboxylic acid group-containing compounds, such as acetic acid, propionic acid or pentanoic acid. Aromatic carboxylic acid group-containing compounds are preferred, in particular benzoic acid. Other suitable pot life extending agents are phenolic compounds, tertiary alcohols such as tertiary butanol and tertiary amyl alcohol, and thiol group-containing compounds. It is also possible to use a combination of the above-mentioned pot life extending agents, such as a combination of an aromatic carboxylic acid group-containing compound and a thiol group-containing compound or a mercapto carboxylic acid.

The composition according to the present invention may be a water-borne composition, a solvent borne composition or a solvent-free composition. Since the composition may be composed of liquid oligomers, it is especially suitable for use as a high solids composition or a solvent-free composition. Alternatively, the coating composition of the present invention is an aqueous powder coating dispersion wherein the isocyanate reactive compound has a Tg above 20° C. The coating composition may as well be used in powder coating compositions and hot melt coatings compositions. For example the theoretical volatile organic content (VOC) in the composition is less than about 450 g/l, e.g. less than about 350 g/l, or less than about 250 g/l.

The compositions of the invention, in particular as coating compositions, can for example also contain conventional additives such as pigments, stabilizers, rheology control agents, flow agents, toughening agents and fillers. Such additional additives will, of course, depend on the intended use of the (coating) composition.

The compositions according to the invention are typically applied to a substrate by conventional techniques such as spraying, electrostatic spraying, roller coating, curtain coating, dipping or brushing. The present formulations are for example useful as a clear coating for outdoor articles, such as automobile and other vehicle body parts. The substrate optionally is for example prepared with a primer and or a color coat or other surface preparation prior to coating with the present compositions.

A layer of a coating composition is for example cured under ambient conditions in the range of a few minutes to 24 hours, for example 5 minutes to 3 h, preferably in the range of 30 minutes to 8 hours (depending on the type of radiation source), after activating the latent catalyst e.g. by exposure to radiation, to form a coating on the substrate having the desired coating properties. One of skill in the art appreciates that the actual curing time depends upon several parameters, including thickness, latent catalyst concentration, ingredients in the formulation; and it depends also upon any additional mechanical aids, such as, for example fans that assist in continuously flowing air over the coated substrate to accelerate the cure rate. If desired, the cure rate may be further accelerated by heating the coated substrate at temperatures generally in the range of from about 60° C. to 150° C. for a period of for example about 15 to 90 minutes. The heating is for example performed by heating in an oven, by subjecting the samples to hot air, by IR-exposure, by microwaves or any other suitable means known in the art. The foregoing heating step is particularly useful under OEM (Original Equipment Manufacture) conditions. The cure time may also depend on other parameters such as for example the humidity of the atmosphere.

The latent catalyst formulations of this invention can for example be used for coating applications and generally in areas where curing of polyurethane is required. For example, the compositions are suitable as clear or pigmented coatings in industrial and maintenance coating applications.

The compositions according to the invention are also suitable for use in uv-curing adhesives, e.g. in the preparation of pressure-sensitive adhesives, laminating adhesives, hot-melt adhesives, moisture-cure adhesives, silane reactive adhesives or silane reactive sealants and the like, and related applications.

Said adhesives can be hot melt adhesives as well waterborne or solvent borne adhesives, liquid solventless adhesives or 2-part reactive adhesives. In particular suitable are pressure-sensitive adhesives (PSA), for example uv-curable hot melt pressure sensitive adhesives. Said adhesives for example comprise at least one rubber component, at least one resin component as tackyfier and at least one oil component, for example in the weight ratio 30:50:20. Suitable tackyfiers are natural or synthetic resins.

The person skilled in the art is aware of suitable corresponding compounds as well as of suitable oil components or rubbers.

The pre-polymerized adhesives containing the isocyanates, for example in blocked form, can for example be processed at high temperature and coated onto the substrate following the hotmelt process, afterwards full cure is achieved by an additional curing step involving the blocked isocyanates, which is realized by photoactivation of the photolatent catalyst.

Hotmelt adhesives are interesting as pressure sensitive adhesives and suitable to replace the use of solvent base compositions, which from an environmental point of view are unwanted. The hotmelt extrusion process in order to achieve the high flow viscosity necessitates high application temperatures. The compositions of the present invention comprising isocyanates are suitable as crosslinkers in the preparation of a hotmelt coating, where the crosslinkers enter into a chemical reaction with the functional comonomers of the (meth)acrylate PSA. After the coating operation, the PSAs are first crosslinked thermally, or implementing the dual crosslinking mechanism, the PSA is subsequently crosslinked with UV light. UV crosslinking irradiation takes place by means of shortwave ultraviolet radiation in a wavelength range from 200 to 400 nm, even expanding in the visible range, e.g. up to 650 nm, depending on the source of the UV radiation equipment, as well as on the photolatent metal catalyst. Such systems and processes are for example described in US 2006/0052472, the disclosure of which hereby is incorporated by reference.

The composition of the present invention is suitable for application on a variety of substrates, e.g. it is especially suitable for providing clear coatings in automotive OEM (Original Equipment Manufacture) or refinish applications typically used in coating car bodies. The coating composition of the present invention can for example be formulated in the form of a clear coating composition, pigmented composition, metallized coating composition, basecoat composition, monocoat composition or a primer. The substrate is for example prepared with a primer and or a color coat or other surface preparation prior to coating with the present compositions.

Suitable substrates for applying the coating composition of the present invention include automobile bodies (or vehicle bodies in general), any and all items manufactured and painted by automobile sub-suppliers, frame rails, commercial trucks and truck bodies, including but not limited to for example beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft.

The substrate further includes industrial and commercial new construction and maintenance thereof; cement and wood floors; walls of commercial and residential structures, such as for example office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

However, the composition of the present invention may also generally be applied on substrates like for example plastics, metals, glass, ceramics, etc. e.g. in it's function as an adhesive (but not limited thereto).

As the isocyanate to be crosslinked with the latent catalyst formulation of the present invention also blocked isocyanates may be used. Said compounds are for example "deblocked" prior to the use in the composition, or may be deblocked during the reaction, or may take part in the reaction in the blocked form, e.g. in the course of the "activation" of the latent catalyst by heat or irradiation.

Blocked isocyanates are known in the art and for example described in a review article by D. A. Wicks, Z. W. Wicks in Progress in Organic Coatings, 41 (2001), 1-83, as well as by C. Gürtler, M. Homann, M. Mager, M. Schelhaas, T. Stingl, Farbe+Lack 2004, 110(12), 34; both documents incorporated herein by reference.

Suitable isocyanate components are for example as given above.

Suitable blocking agents for the isocyanates are the ones known in the art, for example alcohols, phenols, amines, imides, amides, guanidines, amidines, triazoles, pyrazoles, active methylene compounds, ketoximes, oximes, malonesters, alkylacetoacetates, formiates, lactams, imidazoles, triazoles, pyrazoles, CH-acidic cyclic ketones and mercaptans.

Examples are aliphatic, cycloaliphatic, aromatic, or alkyl monoalcohol or phenolic compounds such as, for example, lower aliphatic alcohols including methyl, ethyl, chloroethyl, propyl, butyl, amyl, hexyl, heptyl, octyl, nonyl, decyl and lauryl alcohols, 3,3,5-trimethylhexanol and the like. The aromatic-alkyl alcohols include for example phenylcarbinol and ethylphenylcarbinol. Glycol ethers may be employed such as ethyl glycol monoethyl ether, ethyl glycol monobutyl ether and equivalents thereof. Examples of phenolic compounds which may be employed comprise phenol, substituted phenols such as cresol, xylenol, nitrophenol, chlorophenol, ethyl phenol, t-butyl phenol and 2,5-di-t-butyl-4-hydroxy toluene.

Examples of other blocking agents that may be employed include tertiary hydroxyl amines such as diethylethanolamin, lactams such as caprolactam and oximes such as methyl ethyl ketone oxime, acetone oxime and cyclohexanone oxime.

Specific examples are butanonoxime, diisoproylamine, 1,2,4-triazole, dimethyl-1,2,4-triazole, imidazole, ethylates of maIonic and acetic acid, acetoneoxime, 3,5-dimethylpyrazole, epsilon-caprolactame, N-methyl-, N-ethyl, N-(iso)propyl, N-n-butyl, N-iso-butyl-, N-tert.-butylbenzylamine or, 1,1-dimethylbenzylamine, N-alkyl-N-1,1-dimethylmethylphenylamine; adducts of benzylamine and compounds with activated double bonds, such as maIonic acid esters, N,N-dimethylaminopropylbenzylamine and other compounds comprising tertiary amine groups, where appropriate substituted benzylamines and/or dibenzylamine.

Use of the oximes and phenols in some instances is desirable because some specific polyisocyanates blocked with these oximes or phenols uncap at relatively low temperatures.

Examples of suitable CH-acidic ketones are given in WO 04/058849 and incorporated herein by reference. Preferred are cyclopentanon-2-carboxymethylester, cyclopentanon-2-carboxyethylester, cyclopentanon-2-carboxynitrile, cyclohexanon-2-carboxymethylester, cyclohexanon-2-carboxyethylester, cyclopentanon-2-carbonylmethane, especially cyclopentanon-2-carboxymethylester, cyclopentanon-2-carboxyethylester, cyclohexanon-2-carboxymethylester and cyclohexanon-2-carboxyethylester, in particular cyclopentanon-2-carboxyethylester and cyclohexanon-2-carboxyethylester.

It is evident that also mixtures of different blocking agents may be used and a blocked isocyanate wich may be employed in the presently claimed composition may have different blocking groups.

The compositions contain the blocked isocyanate in an amount, for example, of from 5 to 95% by weight, preferably from 20 to 80% by weight, based on the total composition. The ratio isocyanate to polyol for example varies from about 2:1 to 1:2, preferably from 1.2:1 to 1:1.2. The molecular weight MW of the blocked isocyanate for example ranges from about 100 to 50000, especially from 200 to 20000.

In addition to the photolatent catalyst formulation (c) the photopolymerizable composition may include various additives (d).

Subject of the invention also is a polymerizable composition as described above, comprising in addition to components (a), (b) and (c) a further additive (d), in particular a photosensitizer compound.

Additives (d) are for example additional coinitiators or sensitizers which shift or broaden the spectral sensitivity. In general these are aromatic carbonyl compounds, for example benzophenone, thioxanthone, anthraquinone and 3-acylcoumarin derivatives or dyes such as eosine, rhodamine and erythrosine dyes which improve the overall quantum yield by means, for example, of energy transfer or electron transfer. Examples of suitable dyes which can be added as coinitiators are triarylmethanes, for example malachite green, indolines, thiazines, for example methylene blue, xanthones, thioxanthones, oxazines, acridines or phenazines, for example safranine, and rhodamines of the formula

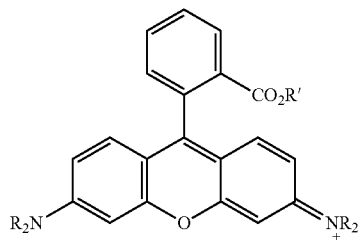

in which R is alkyl or aryl and R' is hydrogen or an alkyl or aryl radical, for example Rhodamine B, Rhodamine 6G or Violamine R, and also Sulforhodamine B or Sulforhodamine G. Likewise suitable are fluorones such as, for example, 5,7-diiodo-3-butoxy-6-fluorone.

Further specific examples of photosensitizers suitable as component (d) are 3-(aroylmethylene)-thiazoline and 3-(aroylmethylene)-thiazoline derivatives and rhodanine derivatives.

Specific exampes of suitable sensitizers are known to the person skilled in the art and are for example published in WO 06/008251, page 36, line 30 to page 38, line 8, the disclosure of which is hereby incorporated by reference.

Particular preference is given to unsubstituted and substituted benzophenones or thioxanthones. Examples of suitable benzophenones are benzophenone, 4,4'-bis(dimethylamino)benzophenone, 4,4'-bis(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyldiphenyl sulfide, 4-methoxy-3,3'-methylbenzophenone, isopropylthioxanthone, chlorothioxanthone, 1-chloro-4-propoxythioxanthone, 2,4-dimethylthioxanthone, 2,4-diethylthioxanthone, 1,3-dimethyl-2-(2-ethylhexyloxy)thioxanthone.

Likewise preferred are mixtures of benzophenones and/or thioxanthones such as, for example, a mixture of benzophenone and 4-methylbenzophenone or of 4-methylbenzophenone and 2,4,6-trimethylbenzophenone.

Within the scope of the present invention also radical-generating photoinitiators, such as hydroxyl ketones, amino ketones, monacyl phosphine oxides, bisacylphosphine oxides and oxime esters can be employed as sensitizers.

Further customary additives (d), depending on the intended use, are optical brighteners, fillers, pigments, dyes, wetting agents, levelling assistants, antistatics, flow improvers and adhesion promoters, antioxidants, desiccants, light stabilizers, e.g. UVabsorbers, for example those of the hydroxybenzotriazole, hydroxyphenylbenzophenone, oxalamide or hydroxyphenyl-s-triazine type. These compounds can be used individually or in mixtures, with or without sterically hindered amines (HALS).

The compositions may also comprise dyes and/or white and colored pigments. Depending on the kind of application organic as well as anorganic pigments are used. Such additives are known to the person skilled in the art, some examples are titan dioxide pigments, e.g. of the rutile type or anatas type, carbon black, zinc oxide, such as zink white, iron oxide, such as iron oxide yellow, iron oxide red, chromium yellow, chromium green, nickel titanium yellow, ultramarine blue, cobalt blue, bismuth vanadate, cadmiumyellow or cadmium red. Examples of organic pigments are mono- or bisazo pigments, as well as metal complexes thereof, phthalocyanine pigments, polycyclic pigments, such as perylene-, anthraquinone-, thioindigo-, chinacridone- or triphenylmethane pigments, as well as diketopyrrolo-pyrole-, isoindolinone-, e.g. tetrachlorisoindolinone-, isoindoline-, dioxazin-, benzimidazolone- and chinophthalone pigments.

The pigments are employed alone or in combination in the compositions according to the invention.

Depending on the intended use the pigments are used in amount customary in the art, for example in an amount of 1-60% by weight, or 10-30% by weight, based on the whole formulation.

The compositions may also comprise organic dyes of different classes. Examples are azo dyes, methin dyes, anthraquinone dyes or metal complex dyes. Customary concentrations are for example 0.1-20%, in particular 1-5%, based on the whole formulation.

The choice of additive is made depending on the field of application and on properties required for this field. The additives described above are customary in the art and accordingly are added in amounts which are usual in the respective application.

In some cases it may be advantageous to carry out heating during or after exposure to light. In this way it is possible in many cases to accelerate the crosslinking reaction.

In the above described processes according to the invention, instead of irradiating with electromagnetic radiation the mixture comprising the latent catalyst of the invention can be subjected to a heat treatment. Another possibility, as mentioned above, is to irradiate the reaction mixture with electromagnetic radiation and simultaneously with irradiating or after the irradiation subject it to a heat treatment.

Subject of the invention therefore also is a process as described above, characterized in that instead of irradiating with electromagnetic radiation the mixture is subjected to a heat treatment, or the mixture is irradiated with electromagnetic radiation and simultaneously with or after the irradiation subjected to a heat treatment.

The compositions of the invention can be employed for various purposes, for example as printing inks, as clearcoats, as white paints, for example for wood, plastics or metal, as coatings, inter alia for paper, wood, metal or plastic, as powder coatings, as daylight-curable exterior coatings for marking buildings and roads, for photographic reproduction processes, for holographic recording materials, for image recording processes or for the production of printing plates which can be developed using organic solvents or aqueous-alkaline media, for the production of masks for screen printing, as dental filling materials, as adhesives, including pressure-sensitive adhesives and moisture curing silane modified adhesives, for sealings, as laminating resins, as etch resists or permanent resists and as solder masks for electronic circuits, for potting components, for mouldings, for the production of three-dimensional articles by mass curing (UV curing in transparent moulds) or by the stereolithography process, as is described, for example, in U.S.

Pat. No. 4,575,330, for the preparation of composite materials (for example styrenic polyesters, which may contain glass fibres and/or other fibres and other assistants) and other thick-layer compositions, for the coating or encapsulation of electronic components, or as coatings for optical fibres.

In surface coatings, it is common to use mixtures of a prepolymer with polyunsaturated monomers which also contain a monounsaturated monomer. The prepolymer here is primarily responsible for the properties of the coating film, and varying it allows the skilled worker to influence the properties of the cured film. The polyunsaturated monomer functions as a crosslinker, which renders the coating film insoluble. The monounsaturated monomer functions as a reactive diluent, by means of which the viscosity is reduced without the need to use a solvent.

The compositions of the present invention are also suitable for "dual-cure" applications. Dual-cure is meant to be a system which comprises heat-crosslinking components and UV-crosslinking components as well, such as for example a 2K polyurethane (as heatcurable component) and an acrylate component (as the UV-curable component).

Said "dual-cure" compositions are cured by a combination of exposure to radiation and heating, wherein the irradiation and heating are either performed simultaneously or first the irradiation step is performed, followed by heating, or, the composition first is heated, followed by exposure to radiation.

The "dual-cure" compositions generally comprise an initiator compound for the heatcuring component and a photoactive compound according to the present invention for the photocuring step.

The compositions of the invention are suitable, for example, as coating materials for substrates of all kinds, examples being wood, textiles, paper, ceramic, glass, plastics such as polyesters, polycarbonates, polyethylene terephthalate, polyamides, polyolefins or cellulose acetate, especially in the form of films, and also metals such as Al, Cu, Ni, Fe, Zn, Mg or Co and GaAs, Si or $SiO_2$, on which it is the intention to apply a protective coating or, by imagewise exposure, an image.

The substrates can be coated by applying a liquid composition, a solution, dispersion, emulsion or suspension to the substrate. The choice of solvent and the concentration depend predominantly on the type of composition and the coating process. The solvent should be inert: in other words, it should not undergo any chemical reaction with the components and should be capable of being removed again after the coating operation, in the drying process. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

Using known coating processes, the solution is applied uniformly to a substrate, for example by spin coating, dip coating, knife coating, curtain coating, brushing, spraying—especially electrostatic spraying—and reverse roll coating and by electrophoretic deposition. It is also possible to apply the layer to a temporary, flexible support and then to coat the final substrate, for example a copper-clad circuit board, by means of layer transfer via lamination.

The amount applied (layer thickness) and the nature of the substrate (layer support) are functions of the desired field of application. The range of layer thicknesses generally comprises values from about 0.1 μm to several mm, for example 1-2000 μm, preferably 5 to 200 μm, in particular 5-60 μm (after evaporation of the solvent).

The compositions according to the invention are also suitable for use in electrodeposition paint or primer: an electrodeposition paint generally consists of a resin containing hydroxyl groups as a base resin and a polyisocyanate compound, optionally blocked with a blocking agent, as a curing agent. The electrodeposition step can be conducted, for example, under the condition of load voltage of 50-400 kV by adjusting usually to 15-35° C. the temperature of the electrodeposition bath comprising the resin composition for electrodeposition paint which has been diluted with deionized water etc. to a solid content concentration of about 5-40% by weight and adjusted pH of the system in the range of 4-9.

The film thickness of the electrodeposition coatings film formable by using the resin composition for electrodeposition paint is not particularly restricted. Preferably it generally is in the range of 10-40 μm based upon a cured film thickness. UV crosslinking irradiation takes place by means of shortwave ultraviolet radiation in a wavelength range from 200 to 650 nm, depending on the UV photoactive moiety in the catalyst according to the present invention and of the used photosensitizer. It is also possible to simultaneously or afterwards submit the electrodeposited paint to a thermal curing step. Examples of such paints are described in US 2005/0131193 and US 2001/0053828, both hereby are incorporated by reference.

The compositions of the present invention are also used to prepare "powder coating compositions" or "powder coatings", either thermal curing or radiation-curable curing ones. By "powder coating compositions" or "powder coatings" is meant the definition as described in "Ullmann's Encyclopedia of Industrial Chemistry, 5th, Completely Revised Edition, Vol. A 18", pages 438 to 444 (1991) in Section 3.4. That is powder coatings are formed by thermoplastic or bakable, crosslinkable polymers, which are applied in powder form to, predominantly metallic, substrates. The way in which the powder is brought into contact with the workpiece that is to be coated typifies the various application techniques, such as electrostatic powder spraying, electrostatic fluidized-bed sintering, fixed bed sintering, fluidized-bed sintering, rotational sintering or centrifugal sintering.

Preferred organic film-forming binders for the powder coating compositions are stoving systems based, for example, on epoxy resins, polyester-hydroxyalkylamides, polyesterglycolurils, epoxy-polyester resins, polyester-triglycidyl isocyanurates, hydroxyfunctional polyester-blocked polyisocyanates, hydroxy-functional polyester-uretdiones, acrylate resins with hardener, or mixtures of such resins.

Radiation-curable powder coatings are for example based on solid resins and monomers containing reactive double bonds, for example maleates, vinyl ethers, acrylates, acrylamides and mixtures thereof. A UV-curable powder coating—in admixture with the composition of the present invention—can for example be formulated by mixing unsaturated polyester resins with solid acrylamides (for example methyl methylacrylamidoglycolate), acrylates, methacrylates or vinyl ethers and a free-radical photoinitiator, such formulations being as described, for example, in the paper "Radiation Curing of Powder Coating", Conference Proceedings, Radtech Europe 1993 by M. Wittig and Th. Gohmann. The powder coatings may also comprise binders as are described, for example, in DE 4228514 and in EP 636669.

The powder coatings may additionally comprise white or coloured pigments. For example, preferably rutiletitanium dioxide can be employed in concentrations of up to 50% by weight in order to give a cured powder coating of good hiding power. The procedure normally comprises electrostatic or tribostatic spraying of the powder onto the substrate, for example metal or wood, melting of the powder by heating, and, after a smooth film has formed, radiation-curing of the coating with ultraviolet and/or visible light.

The composition of the present invention for example further may be employed for the preparation of printing inks. Printing inks in general are known to the person skilled in the art, are used widely in the art and are described in the literature. They are, for example, pigmented printing inks and printing inks coloured with dyes.

The radiation-sensitive compositions of the invention can also be subjected to imagewise exposure. In this case they are used as negative resists. They are suitable for electronics (galvanoresists, etch resists and solder resists), for the production of printing plates, such as offset printing plates, flexographic and relief printing plates or screen printing plates, for the production of marking stamps, and can be used for chemical milling or as microresists in the production of integrated circuits. There is a correspondingly wide range of variation in the possible layer supports and in the processing conditions of the coated substrates.

The term "imagewise" exposure relates both to exposure through a photomask containing a predetermined pattern, for example a slide, exposure by a laser beam which is moved under computer control, for example, over the surface of the coated substrate and so generates an image, and irradiation with computer-controlled electron beams.

Following the imagewise exposure of the material and prior to developing, it may be advantageous to carry out a brief thermal treatment, in which only the exposed parts are thermally cured. The temperatures employed are generally 50-150° C. and preferably 80-130° C.; the duration of the thermal treatment is generally between 0.25 and 10 minutes.

A further field of use for photocuring is that of metal coating, for example the surfacecoating of metal panels and tubes, cans or bottle tops, and photocuring on polymer coatings, for example of floor or wall coverings based on PVC.

Examples of the photocuring of paper coatings are the colourless varnishing of labels, record sleeves or book covers.

The use of the compositions of the invention for preparing shaped articles made from composite compositions is likewise of interest. The composite composition is made up of a self-supporting matrix material, for example a glass-fibre fabric, or else, for example, of plant fibres [cf. K.-P. Mieck, T. Reussmann in Kunststoffe 85 (1995), 366-370], which is impregnated with the photocuring formulation. Shaped articles which are produced from compositions according to the invention are of high mechanical stability and resistance. The compositions of the invention can also be used in moulding, impregnating and coating compositions, as are described, for example, in EP 007086. Examples of such compositions are fine coating resins on which stringent requirements are placed with respect to their curing activity and resistance to yellowing, or fibrereinforced mouldings such as planar or longitudinally or transversely corrugated light diffusing panels.

The sensitivity of the novel compositions to radiation generally extends from about 190 nm through the UV region and into the infrared region (about 20,000 nm, in particular 1200 nm), especially from 190 nm to 650 nm (depending on the photoinititator moiety, optionally in combination with a sensitizer as described hereinbefore) and therefore spans a very broad range. Suitable radiation is present, for example, in sunlight or light from artificial light sources. Consequently, a large number of very different types of light sources are employed. Both point sources and arrays ("lamp carpets") are suitable. Examples are carbon arc lamps, xenon arc lamps, medium-, super high-, high- and low-pressure mercury lamps, possibly with metal halide dopes (metal-halogen lamps), microwave-stimulated metal vapour lamps, excimer lamps, superactinic fluorescent tubes, fluorescent lamps, argon incandescent lamps, electronic flashlights, photographic flood lamps, electron beams and X-rays. The distance between the lamp and the substrate to be exposed in accordance with the invention may vary depending on the intended application and the type and output of lamp, and may be, for example, from 2 cm to 150 cm. Laser light sources, for example excimer lasers, such as krypton F lasers for exposure at 248 nm are also suitable. Lasers in the visible region can also be employed.

Alternatively, the actinic radiation is provided by light emitting diodes (LED) or organic light emitting diodes (OLED), e.g. UV light emitting diodes (UV-LED). Said LEDs allow instant on and off switching of the radiation source. Further, UV-LEDs generally have a narrow wavelength distribution and offer the possibility to customize the peak wavelength and also provide an efficient conversion of electric energy to UV radiation. As mentioned above, depending on the light source used it is advantageous in many cases to employ a sensitizer, as described above, whose absorption spectrum coincides as closely as possible to the emission spectrum of the radiation source.

The examples which follow illustrate the invention in more detail, without restricting the scope of the invention to said examples only. Parts and percentages are, as in the remainder of the description and in the claims, by weight, unless stated otherwise. Where alkyl radicals having more than three carbon atoms are referred to in the examples without any mention of specific isomers, the n-isomers are meant in each case.

PREPARATION EXAMPLES

Catalyst 1: Preparation of

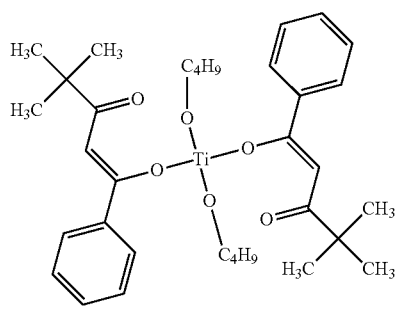

The compound is prepared as described in WO2009/050115, example 55.

Catalyst 2: Preparation of

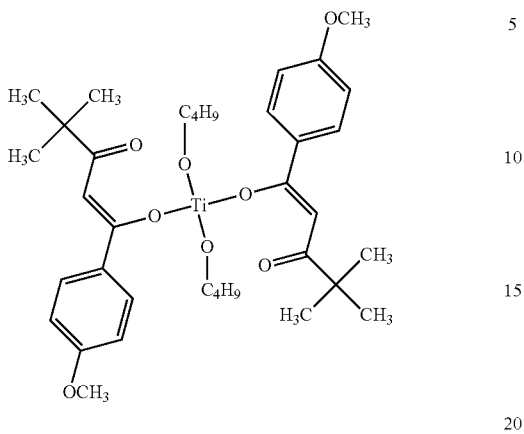

In a 25 ml dry three-neck-flask 1.44 g (4.2 mmol) of Ti(IV) butoxide are dissolved in 5 ml dry dichloromethane under argon. 1.98 g (8.4 mmol) of 4,4-dimethyl-1-(4-methoxyphenyl)pentane-1,3-dione (prepared as described in WO2009/050115, example 52.1) are added in the course of 15 min at room temperature. The reaction mixture is then evaporated and dried under reduced pressure to give 2.58 g of the title compound as yellow oil. The structure is confirmed by $^1$H-NMR spectrum (CDCl$_3$). δ [ppm]: 0.78-1.59 (32H), 3.80-3.88 (6H), 4.42 (4H), 6.24-6.34 (2H), 6.73-6.70 (4H), 7.69-8.01 (4H).

Catalyst 3: Preparation of

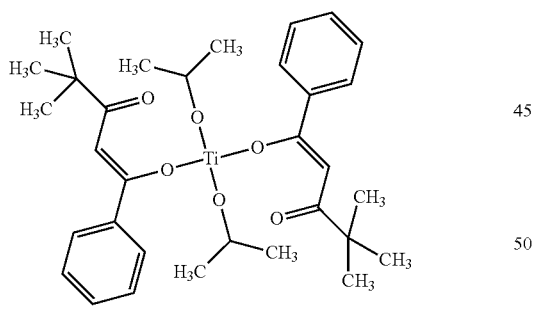

In a 100 ml dry three-neck-flask 17.3 g (61 mmol) Ti(VI) isopropoxide are dissolved in 45 ml dry 2-propanol under argon. 25.0 g (122 mmol) of 4,4-dimethyl-1-phenylpentane-1,3-dione are added slowly in the course of 30 min at room temperature. After 2 h the reaction flask is cooled in an ice-bath and the resulting white precipitate filtered off. The filter cake is washed with 2-propanol and then dried under reduced pressure to give 26.9 g (77%) of the title product as a white solid. The structure is confirmed by $^1$H-NMR spectrum. M.p. 107-109° C.

Catalyst 4: Preparation of

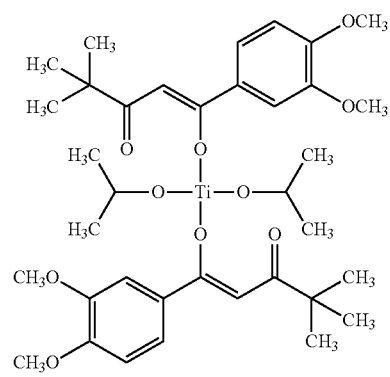

The compound is prepared as described above for catalyst 3, but using 4,4-dimethyl-1-(3,4-dimethoxyphenyl)pentane-1,3-dione as chelate ligand. Yellowish solid; M.p. 117-118° C.

Catalyst 5: Preparation of

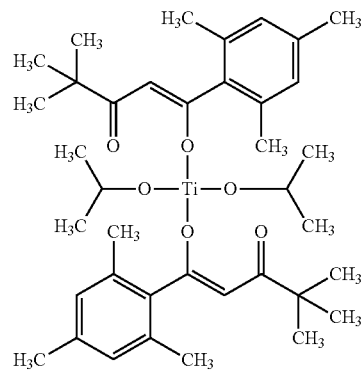

The compound is prepared as described above for catalyst 3, but using 4,4-dimethyl-1-(2,4,6-trimethylphenyl)pentane-1,3-dione as chelate ligand. The product does not precipitate from the reaction mixture and is isolated by removal of the solvent under reduced pressure and subsequent drying under vacuum. Orange resin; $^1$H-NMR (CDCl$_3$), δ [ppm]: 1.05-1.29 (m, 30H), 2.19-2.38 (m, 18H), 4.73-4.88 (m, 2H), 5.76/5.79 (2 s, 2H), 6.78/6.87 (2 s, 4H).

Catalyst 6: Preparation of

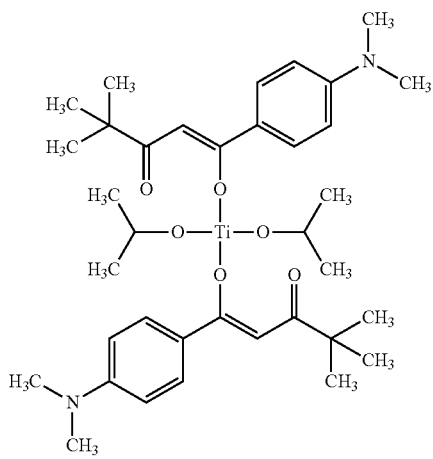

The compound is prepared as described above for catalyst 5, but using 4,4-dimethyl-1-(4-dimethylamino-phenyl)pentane-1,3-dione as chelate ligand. Orange solid; M.p. 69-73° C.

Catalyst 7 (CAS 144665-26-9)

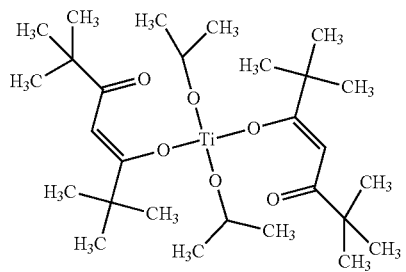

The catalyst is commercially available from ABCR.

Catalyst 8 Preparation of

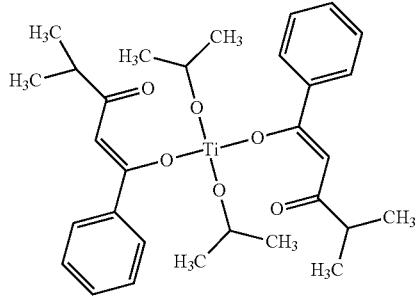

The compound is prepared as described above for catalyst 3, but using 4-methyl-1-phenylpentane-1,3-dione as chelate ligand. White solid; M.p. 86.5-89° C.

Catalyst 9 Preparation of

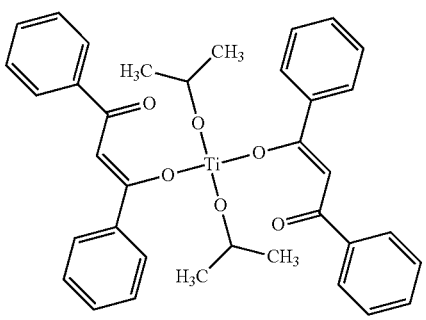

The preparation is done according to the literature procedure published in Bull. Korean Chem. Soc. 1996, 17(7), 637.

Catalyst 10 Preparation of

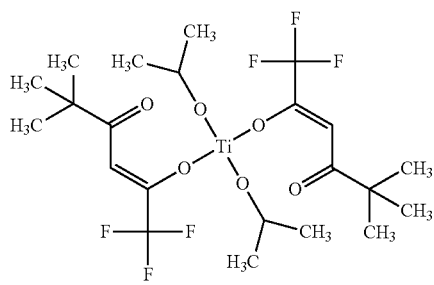

The compound is prepared as described above for catalyst 5, but using 1,1,1-trifluoro-5,5-dimethyl-hexane-2,4-dione as chelate ligand. Yellow oil, partially crystalline. $^1$H-NMR (CDCl$_3$), δ [ppm]: 0.95-1.26 (30H), 4.67-4.75 (2H), 6.06-6.10 (2H).

Catalyst 11 Preparation of

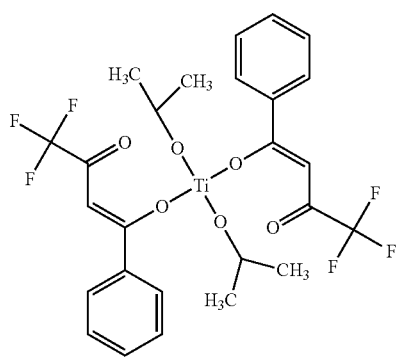

The compound is prepared as described above for catalyst 3, but using 4,4,4-trifluoro-1-phenyl-butane-1,3-dione as chelate ligand. White solid; M.p. 77-79.5° C.

Catalyst 12 Preparation of

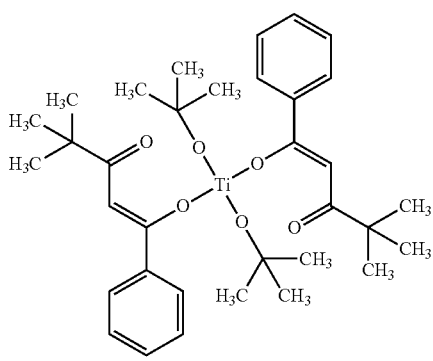

In a 100 ml dry three-neck-flask 6.00 g (10.5 mmol) of Catalyst 3 are suspended in 60 g of anhydrous t-butyl-alcohol. The reaction mixture is heated to give a clear solution and the solvent is distilled off under atmospheric pressure to give a white solid. After drying under vacuum, 6.29 g of the title compound is obtained as white powder. The structure is confirmed by $^1$H-NMR spectroscopy. M.p. 165-167° C.

Catalyst 13 Preparation of

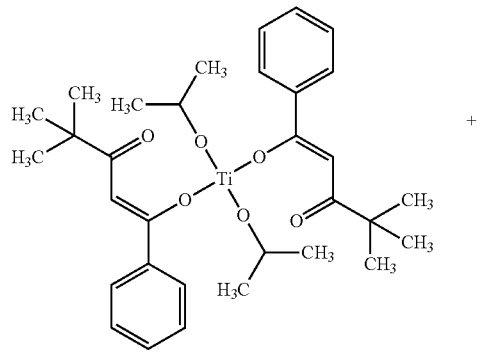

In a 5 ml glass flask 1.0 g (1.7 mmol) of Catalyst 3 and 0.25 g (1.2 mmol) of 4,4-dimethyl-1-(4-methoxy-phenyl)pentane-1,3-dione are heated to 80° C. until an orange clear resin is obtained. The product is confirmed to be a homogenous mixture of the two compounds by $^1$H-NMR spectrum in CDCl$_3$.

Catalyst 14 Preparation of

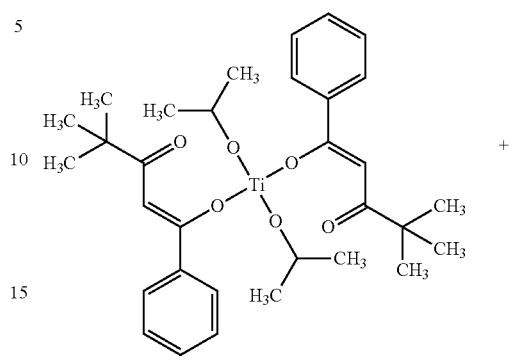

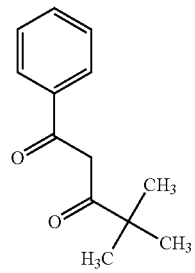

In a 5 ml glass flask 1.0 g (1.7 mmol) of Catalyst 3 and 1.0 g (4.9 mmol) of 4,4-dimethyl-1-(4-methoxy-phenyl)pentane-1,3-dione are heated to 60° C. until an orange clear liquid is obtained. The product is confirmed to be a homogenous mixture of the two compounds by $^1$H-NMR spectrum in CDCl$_3$.

Catalyst 15 Preparation of

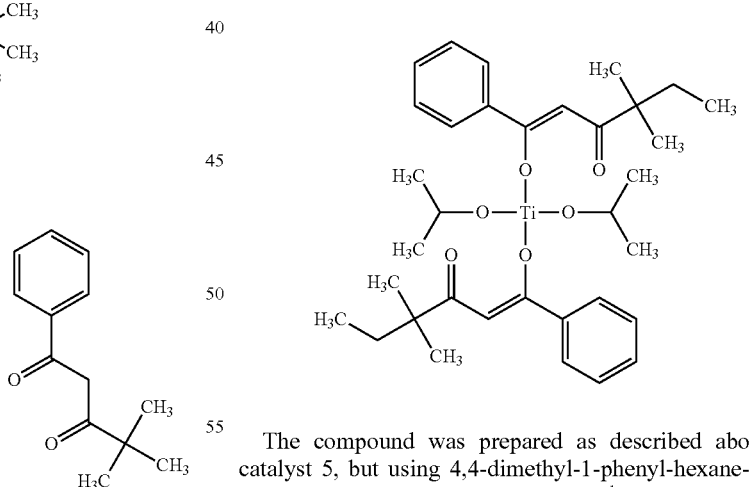

The compound was prepared as described above for catalyst 5, but using 4,4-dimethyl-1-phenyl-hexane-1,3-dione as chelate ligand. Yellowish oil. $^1$H-NMR (CDCl$_3$), δ [ppm]: 0.54-1.75 (m, 34H), 4.76-4.85 (m, 2H), 6.28/6.33 (2 s, 2H), 7.29-7.49 (m, 6H), 7.72-7.75/8.00-8.03 (2 m, 4H).

Preparation of 1,3-Diketone Ligands 1-5

Preparation of 1,3-diketone ligands is done as described in Organic Letters 2007, 21, 4139-4142, starting from the corresponding carboxylic acid and methylketone reactants via the benzotriazole amide intermediate.

| Ligand | Starting materials | Aspect | Yield | M.p. [° C.] | ¹H-NMR in CDCl₃ δ [ppm] |
|---|---|---|---|---|---|
| 1 | 3,3-dimethyl-2-butanone; 1-methyl-cyclohexane-carboxylic acid acid | yellow oil | 64% | | Enol tautomer: 1.12 (s, 3H), 1.18 (s, 9H); 1.31-1.56 (m, 8H); 1.88-1.94 (m, 2H); 5.75 (s, 1H) |
| 2 | acetophenone; 1-phenyl-cyclopentane-carboxylic acid | yellow solid | 77% | 114-120 | |
| 3 | acetophenone; 1-methyl-cyclohexane-carboxylic acid | orange oil | 90% | | Enol tautomer: 1.19 (s, 3H); 1.35-1.61 (m, 8H); 1.99-2.04 (m, 2H); 6.33 (s, 1H); 7.43-7.53 (m, 3H) 7.87-7.90 (m, 2H) |
| 4 | 3,3-dimethyl-2-butanone; benzophenone-4-carboxylic acid | white solid | 49% | 67-76 | |
| 5 | 3,3-dimethyl-2-butanone; 1-phenyl-cyclopentane-carboxylic acid | white solid | 70% | 45-47 | |

Catalyst 16 Preparation of

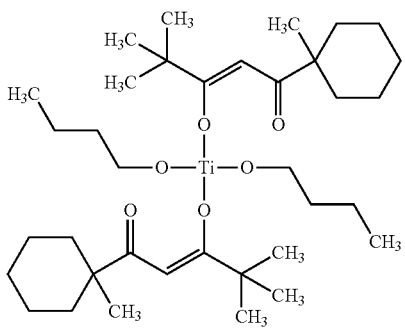

The compound is prepared as described above for catalyst 2, but using ligand 1 as chelate ligand. Yellow oil; $^1$H-NMR (CDCl$_3$), δ [ppm]: 0.81-2.13 (m, 58H), 4.21-4.34 (m, 4H), 5.81 (s, 2H).

Catalyst 17 Preparation of

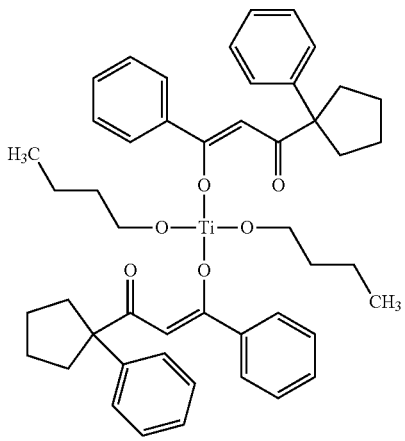

The compound is prepared as described above for catalyst 2, but using ligand 2 as chelate ligand. Orange oil; $^1$H-NMR (CDCl$_3$), δ [ppm]: 0.77-2.74 (m, 30H), 4.39-4.61 (m, 4H), 6.06/6.20 (2 s, 2H), 6.88-7.97 (m, 20H).

Catalyst 18 Preparation of

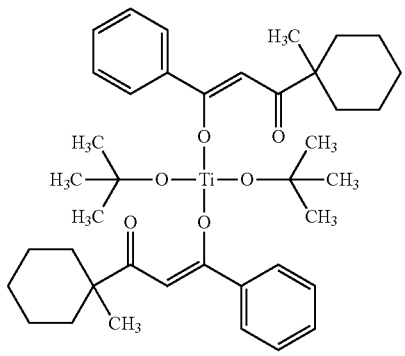

In a 25 ml three-neck-flask 0.8 g (2.81 mmol) of Ti(IV) isopropoxide are dissolved in 10 ml toluene under argon. 1.38 g (5.63 mmol) of ligand 3 are added at room temperature. After 2 h, 1.25 g (16.9 mmol) tert-butyl-alcohol are added and the reaction mixture is heated to reflux, then the solvent is evaporated and the residue dried under reduced pressure to give 1.6 g (87%) of the title compound as orange resin. The structure is confirmed by $^1$H-NMR spectrum (CDCl$_3$, δ [ppm]): 0.93-1.60 (m, 40H); 1.87-1.91 (m, 2H); 2.19-2.22 (m, 2H); 6.27-6.33 (m, 2H); 7.33-7.46 (m, 6H); 7.71-7.76 (m, 2H); 7.91-8.00 (m, 2H).

Catalyst 19 Preparation of

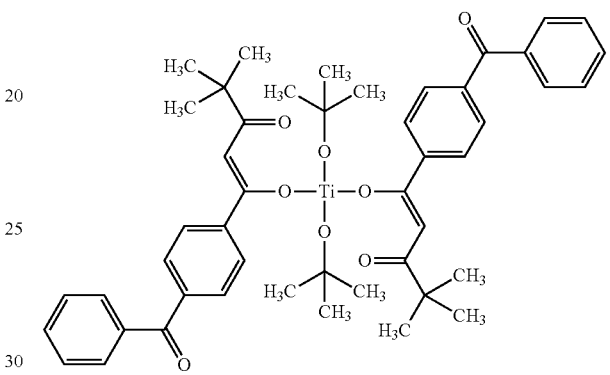

The compound is prepared as described above for catalyst 18, but using ligand 4 as chelate ligand. Yellow resin; $^1$H-NMR (CDCl$_3$), δ [ppm]: 1.03-1.33 (m, 36H); 6.32 (s, 2H); 7.43-8.08 (m, 18H).

Catalyst 20 Preparation of

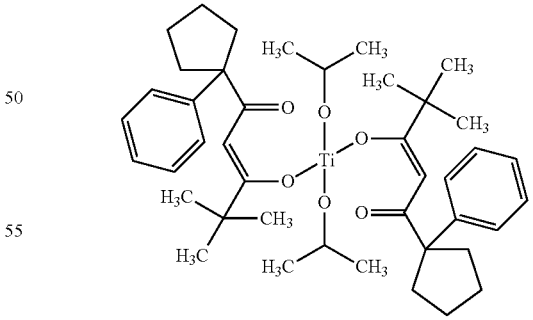

The compound is prepared as described above for catalyst 5, but using ligand 5 as chelate ligand. Colorless resin. $^1$H-NMR (CDCl$_3$), δ [ppm]: 0.84-1.20 (m, 30H), 1.45-2.70 (m, 16H), 4.50-4.65 (m, 2H), 5.50-5.60 (m, 2H), 7.12-7.47 (m, 10H).

Catalyst 21 Preparation of

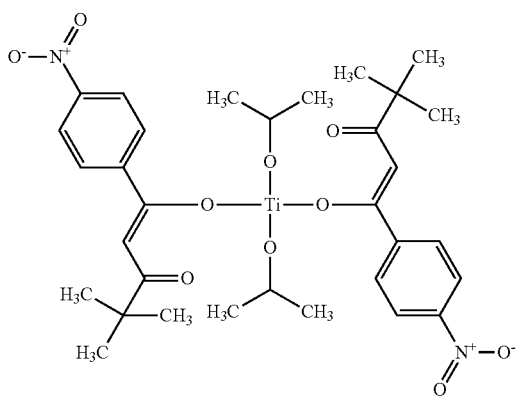

The compound is prepared as described above for catalyst 3, but using 4,4-dimethyl-1-(4-nitrophenyl)pentane-1,3-dione as chelate ligand. Yellowish solid; M.p. 139-143° C.

Preparation of Catalyst 22

22a) 7-Methyl-thioxanthene-9-one-3-carboxylic acid 1,1-dimethyl-propyl ester

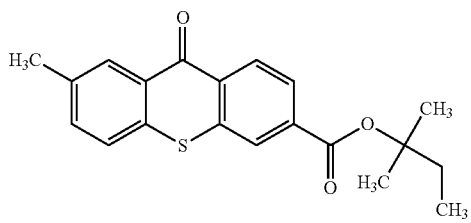 [SMILES: CCC(C)(C)OC(=O)c1ccc2c(=O)c3cc(C)ccc3sc2c1]

7.0 g (25.9 mmol) of 7-Methyl-thioxanthene-9-one-3-carboxylic acid is added to 20 ml thionylchloride and the suspension is heated to reflux during 5 h. The excess of thionylchloride is distilled off, the residue cooled to 0° C., dissolved in 30 ml of DMF, then 11.4 g (103.6 mmol) of sodium-tert-pentoxide is slowly added. The reaction mixture is poured into ice-water and the product is extracted with ethylacetate. The solvent is evaporated under reduced pressure and the crude product purified by chromatography over silica gel using toluene as eluent to yield 1.8 g (20%) of title compound as a yellow solid. The structure is confirmed by $^1$H-NMR spectra. M.p. 114-116° C.

22b) Ligand 6

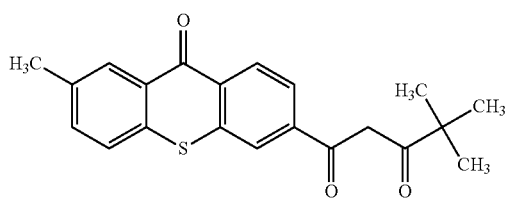 [SMILES: Cc1ccc2sc3cc(C(=O)CC(=O)C(C)(C)C)ccc3c(=O)c2c1]

0.54 g (5.3 mmol) of 3,3-dimethyl-2-butanone is added to a solution of 0.62 g (5.3 mmol) of potassium-tert-butoxide in 10 ml of DMF at 0° C. 1.5 g (4.41 mmol) of 7-methyl-thioxanthene-9-one-3-carboxylic acid 1,1-dimethyl-propyl ester is added, the reaction mixture stirred for 4 h at 25° C., then poured into 10 ml of ice-water containing 10 ml concentrated aq. HCl. Extraction with toluene and evaporation of the solvent gives the crude product which is purified by chromatography over silica gel using toluene as eluent to yield 0.56 g (36%) of the title compound as a yellow solid. The structure is confirmed by $^1$H-NMR spectra. M.p.: 198-203° C.

22c) Catalyst 22

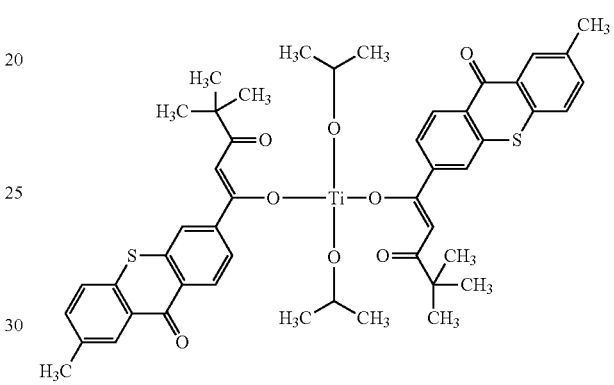

The compound is prepared as described above for catalyst 3, but using ligand 6 as chelate ligand. Yellow solid; M.p. 160-164° C.

Catalyst 23 Preparation of

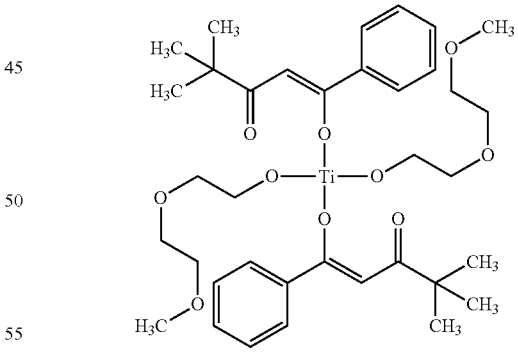

1.08 g (1.9 mmol) of catalyst 3 is dissolved under argon in 20 ml of absolute toluene. The clear solution is stirred at room temperature and 0.46 g (3.8 mmol) of 2-(2-methoxyethoxy)ethanol are slowly added during 15 minutes. 2-Propanol is removed by azeotropic distillation at 60° C. under reduced pressure (80 mbar) during 2 hours. The solvent is then completely removed under reduced pressure to give 1.24 g (94%) of the title product as a yellow solid. The structure is confirmed by $^1$H-NMR spectrum. M.p. 166-210° C.

Preparation of Catalyst 24

24a) Ligand 7

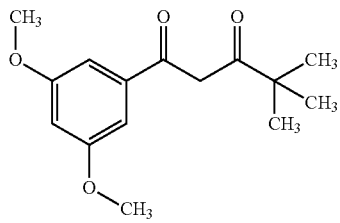 [SMILES: COc1cc(OC)cc(C(=O)CC(=O)C(C)(C)C)c1]

The compound is prepared as described above for ligand 6 from methyl 3,5-dimethoxybenzoate and 3,3-dimethyl-2-butanone. Yellow solid; $^1$H-NMR (CDCl$_3$), δ [ppm]: 1.24 (s, 9H), 3.83 (s, 6H), 6.24 (s, 1H), 6.61 (d, 1H), 7.02 (d, 2H).

24b) Catalyst 24

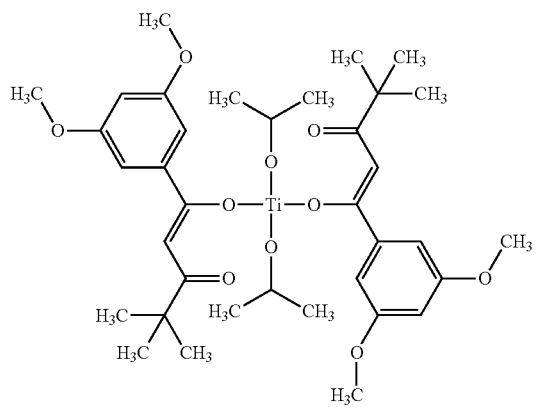

The compound is prepared as described above for catalyst 5, but using ligand 7 as chelate ligand. Orange solid. M.p. 99-102° C.

APPLICATION EXAMPLES

The following commercially available 1,3-diketones are used:

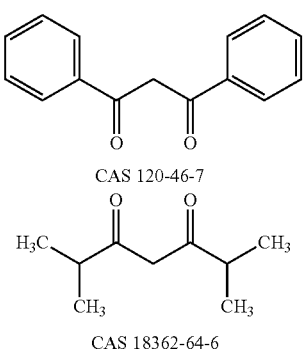

CAS 120-46-7

CAS 18362-64-6

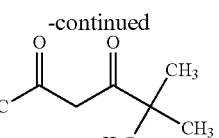

CAS 22767-90-4

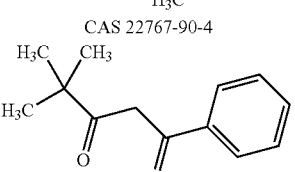

CAS 13988-67-5

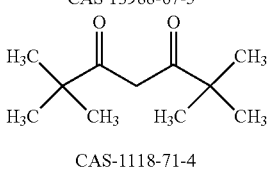

CAS-1118-71-4

Curing and Pot-Life of a Two Packs Polyurethane System Based on a Polyacrylic Polyol and an aliphatic polyisocyanate:

The polyurethane is the reaction product of two basic components: a polyol (Component A) and a polyisocyanate (Component B). An organometallic photolatent catalyst is added to the total composition of A and B in order to speed up the reaction of A with B.

In the following examples Component A includes all ingredients other than the polyisocyanate. The photolatent catalyst and the 1,3 diketone are dissolved carefully into Component A prior to the addition of Component B.

Component A1

| | |
|---|---|
| 73.1 | parts of a polyol (Desmophen ® A VP LS 2350; Bayer AG) |
| 0.9 | parts of a flow improver (Byk 355; Byk-Chemie) |
| 0.7 | parts of a defoamer (Byk 141 ; Byk-Chemie) |
| 0.7 | parts of a flow improver (Byk 333; Byk-Chemie) |
| 24.6 | parts of xylene/methoxypropylacetate/butylacetate (1/1/1) |

Component B1

Aliphatic polyisocyanate [(HDI-Trimer) Desmodur® N3390 BA; Bayer AG]

The basic testing formulations are composed of:

| | |
|---|---|
| 7.52 | parts of component A1 |
| 2.00 | parts of component B1 |

Example A1

The testing samples are prepared by adding 1,3-diketones (ligands) and 0.025% weight of Metal (on solid) of photolatent catalysts. The amount of ligand is adjusted to have the following weight ratios between the organometallic photolatent catalyst and ligand: 70/30, 80/20 and 90/10.

After preparation, the mixtures are stored in the dark at room temperature. The potlife of each formulation is monitored by measuring the viscosity at 25° C. by the mean of a viscometer from Epprecht Instruments+Control AG. The measurements are done after the preparation of formulation and each hour until 7 h. The viscosity increases with the time. The lower the increase of the viscosity, the longer is the potlife of the formulation and consequently the larger is the working window. The catalysts and ligands which are used in the experiment as well as results are presented in the following table 1.

TABLE 1

| Catalysts | Ratio | Viscosity at 25° C. (poises) | | | | | | | |
|---|---|---|---|---|---|---|---|---|---|
| | | 0 h | 1 h | 2 h | 3 h | 4 h | 5 h | 6 h | 7 h |
| No catalyst | — | 0.6 | 0.6 | 1.2 | 1.7 | 2.2 | 2.2 | 2.4 | 2.5 |
| Catalyst 3 | — | 1.8 | 5.8 | 16.6 | gelled | gelled | gelled | gelled | gelled |
| Catalyst 3/ CAS 1118-71-4 | 70/30 | 1.4 | 2.3 | 2.8 | 3.8 | 5.1 | 6.5 | 8.6 | 9.6 |
| Catalyst 3/ CAS 1118-71-4 | 80/20 | 1.5 | 3 | 4 | 5.6 | 8.4 | 13 | 24 | 44.8 |
| Catalyst 3/ CAS 1118-71-4 | 90/10 | 1.9 | 3.2 | 5.3 | 9.3 | 16.4 | gelled | gelled | gelled |
| Catalyst 3/ CAS 18362-64-6 | 70/30 | 1.8 | 2.8 | 3.3 | 3.8 | 5.3 | 8.6 | 8.8 | 12.2 |
| Catalyst 3/ CAS 18362-64-6 | 80/20 | 1.7 | 2.8 | 4.5 | 5.4 | 10 | 18 | 19.8 | 31.6 |
| Catalyst 3/ CAS 18362-64-6 | 90/10 | 2 | 3.6 | 9.3 | 13 | 29.6 | gelled | gelled | gelled |
| Catalyst 3/ CAS 120-46-7 | 70/30 | 0.8 | 1.2 | 2.8 | 5.4 | 11.8 | 13 | 16.4 | 32 |
| Catalyst 3/ CAS 120-46-7 | 80/20 | 1 | 1.6 | 3.5 | 6.9 | 14.4 | 24.4 | 48 | gelled |
| Catalyst 3/ CAS 120-46-7 | 90/10 | 0.8 | 2.8 | 3.6 | 12.4 | 18.4 | 39.6 | gelled | gelled |
| Catalyst 3/ CAS 13988-67-5 | 70/30 | 1.4 | 2.4 | 3.2 | 4.2 | 5.9 | 8 | 11.8 | 14 |
| Catalyst 3/ CAS 13988-67-5 | 80/20 | 1.5 | 3 | 4.2 | 5.8 | 9.1 | 14.6 | 27.2 | gelled |
| Catalyst 3/ CAS 13988-67-5 | 90/10 | 1.8 | 4.2 | 6.4 | 9.4 | 22.4 | gelled | gelled | gelled |
| Catalyst 3/ CAS 22767-90-4 | 70/30 | 1.2 | 2 | 2 | 3 | 3.4 | 3.8 | 4.7 | 5.2 |
| Catalyst 3/ CAS 22767-90-4 | 80/20 | 1.4 | 2.6 | 3.4 | 10.4 | 11.4 | 15.2 | gelled | gelled |
| Catalyst 3/ CAS 22767-90-4 | 90/10 | 1.3 | 3.2 | 5.8 | 17.6 | 27.2 | gelled | gelled | gelled |

Example A2

The testing samples are prepared by adding 1,3-diketones (ligands) and 0.025% weight of Metal (on solid) of photo-latent catalysts. The amount of ligand is adjusted to have the following ratios between the organometallic photolatent catalyst and ligand: 70/30, 80/20 and 90/10.

The mixtures are applied with a 76 μm split coater on two glass plates of 30 cm length. One plate is irradiated using a UV processor from IST Metz (mercury lamps, 2*100 m) at a belt speed of 5 m/min, whereas a second one is not irradiated. The reactivity of the mixtures is determined by measuring the "tack free time". Therefore the samples are set up on a drying recorder from ByK Gardner, where a needle is moving with a constant speed over the coated substrate for 24 h. The recording is carried out in the dark, at room temperature. The "tack free time" is the period of time needed for the sample to cure in such a manner that no tack is left on the surface upon touch of the needle in the recorder.

The potlife of the formulation is visually monitored at room temperature. In fact, the time when the formulation is gelled in the flask, is determined.

The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst.

The higher the value of potlife, the more stable is the mixture in the flask.

The catalysts which are used in the test as well as the results are collected in the following table 2.

TABLE 2

| | | | Tack free time (stage3/4) h | |
|---|---|---|---|---|
| Catalysts | Ratio | Gelled time | No irradiation | 2*100 W 5 m/min |
| No catalyst | — | >24 h | — | — |
| Catalyst 3 | — | 2 < h < 3 | 6.5 | 2.5 |
| Catalyst 3/ CAS 1118-71-4 | 70/30 | 7 < h < 24 | 7.5 | 5 |
| Catalyst 3/ CAS 1118-71-4 | 80/20 | 7 < h < 24 | 7 | 3.5 |
| Catalyst 3/ CAS 1118-71-4 | 90/10 | 4 < h < 5 | 8 | 2.5 |
| Catalyst 3/ CAS 18362-64-6 | 70/30 | 7 < h < 24 | 8 | 6.5 |
| Catalyst 3/ CAS 18362-64-6 | 80/20 | 7 < h < 24 | 9 | 4.5 |
| Catalyst 3/ CAS 18362-64-6 | 90/10 | 4 < h < 5 | 9 | 4 |
| Catalyst 3/ CAS 120-46-7 | 70/30 | 7 < h < 24 | 9.5 | 5.5 |
| Catalyst 3/ CAS 120-46-7 | 80/20 | 6 < h < 7 | 9 | 3.5 |
| Catalyst 3/ CAS 120-46-7 | 90/10 | 5 < h < 6 | 6.5 | 3.5 |
| Catalyst 3/ CAS 13988-67-5 | 70/30 | 7 < h < 24 | 9 | 4.5 |
| Catalyst 3/ CAS 13988-67-5 | 80/20 | 6 < h < 7 | 7.5 | 4 |

TABLE 2-continued

| Catalysts | Ratio | Gelled time | No irradiation | 2*100 W 5 m/min |
|---|---|---|---|---|
| Catalyst 3/ CAS 13988-67-5 | 90/10 | 4 < h < 5 | 6 | 2 |
| Catalyst 3/ CAS 22767-90-4 | 70/30 | 7 < h < 24 | 10 | 5.5 |
| Catalyst 3/ CAS 22767-90-4 | 80/20 | 5 < h < 6 | 8.5 | 5 |
| Catalyst 3/ CAS 22767-90-4 | 90/10 | 4 < h < 5 | 8 | 4 |
| Catalyst 14/ 0.125% benzophenone (DAROCUR® from BASF SE) | — | 7 < h < 24 | 15 | 11.5 |

Tack free time (stage3/4) h

Example A3

The testing samples are prepared by adding 1,3-diketones (ligands) and 0.025% weight of Metal (on solid) of photolatent catalysts. The amount of ligand is adjusted to have the following weight ratios between the organometallic photolatent catalyst and ligand: 70/30, 80/20 and 90/10.

After preparation, the mixtures are stored in the dark at room temperature. The potlife of each formulation is monitored by measuring the viscosity at 25° C. by the mean of a viscometer from Epprecht Instruments+Control AG. The measurements are done after the preparation of formulation and each hour until 7 h. The viscosity increases with the time. The lower the increase of the viscosity, the longer is the potlife of the formulation and consequently the larger is the working window. The catalysts and ligands which are used in the experiment as well as results are presented in the following table 3.

TABLE 3

| Catalysts | Ratio | 0 h | 1 h | 2 h | 3 h | 4 h | 5 h | 6 h | 7 h |
|---|---|---|---|---|---|---|---|---|---|
| No catalyst | — | 1.2 | 1.8 | 1.8 | 2 | 2 | 2.4 | 2.6 | 3 |
| Catalyst 7 | — | 1.4 | 4.8 | 10.8 | 16 | gelled | gelled | gelled | gelled |
| Catalyst 7/ CAS 18362-64-6 | 70/30 | 1.4 | 2.4 | 3 | 3.8 | 4.8 | 6 | 7.4 | 8.8 |
| Catalyst 7/ CAS 18362-64-6 | 80/20 | 1.6 | 2.6 | 3.6 | 5.2 | 7.2 | 11.2 | 16 | 20 |
| Catalyst 7/ CAS 18362-64-6 | 90/10 | 1.6 | 4.4 | 8.4 | 19.2 | 24 | gelled | gelled | gelled |
| Catalyst 7/ CAS 120-46-7 | 70/30 | 1.4 | 2.6 | 4.2 | 6 | 10.4 | 14.4 | 20 | gelled |
| Catalyst 7/ CAS 120-46-7 | 80/20 | 1.6 | 3.4 | 5.6 | 10 | 17.6 | 24 | gelled | gelled |
| Catalyst 7/ CAS 120-46-7 | 90/10 | 1.6 | 4 | 8.2 | 19.2 | 20 | gelled | gelled | gelled |

Viscosity at 25° C. (poises)

Example A4

The testing samples are prepared by adding 1,3-diketones (ligands) and 0.025% weight of Metal (on solid) of photolatent catalysts. The amount of ligand is adjusted to have the following ratios between the organometallic photolatent catalyst and ligand: 70/30, 80/20 and 90/10.

The mixtures are applied with a 76 µm split coater on two glass plates of 30 cm length. One plate is irradiated using a UV processor from IST Metz (mercury lamps, 2*100 m) at a belt speed of 5 m/min, whereas a second one is not irradiated. The reactivity of the mixtures is determined by measuring the "tack free time". Therefore the samples are set up on a drying recorder from ByK Gardner, where a needle is moving with a constant speed over the coated substrate for 24 h. The recording is carried out in the dark, at room temperature. The "tack free time" is the period of time needed for the sample to cure in such a manner that no tack is left on the surface upon touch of the needle in the recorder.

The potlife of the formulation is visually monitored at room temperature. In fact, the time when the formulation is gelled in the flask, is determined.

The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst.

The higher the value of potlife, the more stable is the mixture in the flask.

The catalysts which are used in the test as well as the results are collected in the following table 4.

TABLE 4

| Catalyst | Ratio | Gelled time | No irradiation | 2*100 W 5 m/min |
|---|---|---|---|---|
| No catalyst | — | >24 h | — | — |
| Catalyst 7 | — | 3 < h < 4 | 6 | 1.5 |
| Catalyst 7/ CAS 18362-64-6 | 70/30 | 7 < h < 24 | 7.5 | 5.5 |
| Catalyst 7/ CAS 18362-64-6 | 80/20 | 7 < h < 24 | 6.5 | 3 |
| Catalyst 7/ CAS 18362-64-6 | 90/10 | 4 < h < 5 | 6 | 2 |

Tack free time (stage3/4) h

TABLE 4-continued

| Catalyst | Ratio | Gelled time | No irradiation | 2*100 W 5 m/min |
|---|---|---|---|---|
| Catalyst 7/ CAS 120-46-7 | 70/30 | 6 < h < 7 | 5 | 3.2 |
| Catalyst 7/ CAS 120-46-7 | 80/20 | 5 < h < 6 | 5 | 2 |

Tack free time (stage3/4) h

TABLE 4-continued

| Catalyst | Ratio | Gelled time | Tack free time (stage3/4) h | |
|---|---|---|---|---|
| | | | No irradiation | 2*100 W 5 m/min |
| Catalyst 7/ CAS 120-46-7 | 90/10 | 4 < h < 5 | 4.2 | 1.5 |

Example A5

The testing samples are prepared by adding 1,3-diketones (ligands) and 0.025% weight of Metal (on solid) of photolatent catalysts. The amount of ligand is adjusted to have the following weight ratios between the organometallic photolatent catalyst and ligand: 70/30, 80/20 and 90/10.

After preparation, the mixtures are stored in the dark at room temperature. The potlife of each formulation is monitored by measuring the viscosity at 25° C. by the mean of a viscometer from Epprecht Instruments+Control AG. The measurements are done after the preparation of formulation and each hour until 7 h. The viscosity increases with the time. The lower the increase of the viscosity, the longer is the potlife of the formulation and consequently the larger is the working window. The catalysts and ligands which are used in the experiment as well as results are presented in the following table 5.

TABLE 5

| Catalysts | Ratio | Viscosity at 25° C. (poises) | | | | | | | |
|---|---|---|---|---|---|---|---|---|---|
| | | 0 h | 1 h | 2 h | 3 h | 4 h | 5 h | 6 h | 7 h |
| No catalyst | — | 1.6 | 1.8 | 1.8 | 2 | 2.4 | 2.6 | 2.8 | 3 |
| Catalyst 8 | — | 2 | 4.8 | 8.8 | 12.4 | 25 | gelled | gelled | gelled |
| Catalyst 8/ CAS 18362-64-6 | 70/30 | 1.8 | 2.4 | 3.2 | 3.8 | 5.2 | 6.2 | 8.4 | 15.6 |
| Catalyst 8/ CAS 18362-64-6 | 80/20 | 2 | 3.2 | 4.2 | 5.2 | 8.8 | 12.4 | 21.6 | 27 |
| Catalyst 8/ CAS 18362-64-6 | 90/10 | 2 | 3.6 | 5.6 | 6.6 | 12 | 20 | 32 | gelled |
| Catalyst 8/ CAS 120-46-7 | 70/30 | 1.8 | 4 | 4.4 | 5 | 8.4 | 12 | 17.6 | 22 |
| Catalyst 8/ CAS 120-46-7 | 80/20 | 2 | 4.2 | 5.8 | 10 | 18.6 | 23.2 | 33 | gelled |
| Catalyst 8/ CAS 120-46-7 | 90/10 | 2 | 4.4 | 7.6 | 10 | 22.4 | 33 | gelled | gelled |

Example A6

The testing samples are prepared by adding 1,3-diketones (ligands) and 0.025% weight of Metal (on solid) of photolatent catalysts. The amount of ligand is adjusted to have the following ratios between the organometallic photolatent catalyst and ligand: 70/30, 80/20 and 90/10.

The mixtures are applied with a 76 μm split coater on two glass plates of 30 cm length. One plate is irradiated using a UV processor from IST Metz (mercury lamps, 2*100 m) at a belt speed of 5 m/min, whereas a second one is not irradiated. The reactivity of the mixtures is determined by measuring the "tack free time". Therefore the samples are set up on a drying recorder from ByK Gardner, where a needle is moving with a constant speed over the coated substrate for 24 h. The recording is carried out in the dark, at room temperature. The "tack free time" is the period of time needed for the sample to cure in such a manner that no tack is left on the surface upon touch of the needle in the recorder.

The potlife of the formulation is visually monitored at room temperature. In fact, the time when the formulation is gelled in the flask, is determined.

The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst.

The higher the value of potlife, the more stable is the mixture in the flask.

The catalysts which are used in the test as well as the results are collected in the following table 6.

TABLE 6

| Catalyst | Ratio | Gelled time | Tack free time (stage3/4) h | |
|---|---|---|---|---|
| | | | No irradiation | 2*100 W 5 m/min |
| No catalyst | — | >24 h | — | — |
| Catalyst 8 | — | 4 < h < 5 | 4.2 | 2 |
| Catalyst 8/ CAS 18362-64-6 | 70/30 | 7 < h < 24 | 6.2 | 3.7 |
| Catalyst 8/ CAS 18362-64-6 | 80/20 | 7 < h < 24 | 5.5 | 2.5 |
| Catalyst 8/ CAS 18362-64-6 | 90/10 | 6 < h < 7 | 5 | 2.5 |

TABLE 6-continued

| Catalyst | Ratio | Gelled time | Tack free time (stage3/4) h | |
|---|---|---|---|---|
| | | | No irradiation | 2*100 W 5 m/min |
| Catalyst 8/ CAS 120-46-7 | 70/30 | 7 < h < 24 | 5.5 | 3.5 |
| Catalyst 8/ CAS 120-46-7 | 80/20 | 6 < h < 7 | 6 | 2.5 |
| Catalyst 8/ CAS 120-46-7 | 90/10 | 5 < h < 6 | 4.5 | 2.2 |

Example A7

The testing samples are prepared by adding the Ti catalyst and 1,3-diketone additive to 7.52 g of component A1 of the basic testing formulation of example A1. After mixing the component A1 with 2.0 g of component B1, the visual pot-life of the formulation (time where no change in viscosity is visible), the time to considerable viscosity, and the time to high viscosity are observed.

The catalysts and additives which are used in the test as well as the results of the tests are collected in the following table 7.

TABLE 7

| Catalyst/(g) | Additive/(g) | Visual Pot-life (min.) | Considerably viscous (min.) | Highly viscous (min.) |
|---|---|---|---|---|
| — | — | >600 | | >3000 |
| Catalyst 1/0.075 | — | 70 | 110 | 130 |
| Catalyst 1/0.075 | CAS 1118-71-4/0.019 | 210 | 450 | 660 |
| Catalyst 2/0.083 | — | 50 | 90 | 120 |
| Catalyst 2/0.083 | CAS 120-46-7/0.021 | 180 | 400 | 480 |
| Catalyst 4/0.087 | — | 50 | 100 | 120 |
| Catalyst 4/0.087 | CAS 13988-67-5/0.022 | 230 | 360 | 450 |
| Catalyst 5/0.082 | — | 90 | 200 | 350 |
| Catalyst 5/0.082 | CAS 1118-71-4/0.021 | 360 | 840 | 1200 |
| Catalyst 6/0.083 | — | 50 | 80 | 100 |
| Catalyst 6/0.083 | CAS 120-46-7/0.021 | 120 | 210 | 240 |
| Catalyst 9/0.077 | — | 60 | 180 | 240 |
| Catalyst 9/0.077 | CAS 18362-64-6/0.019 | 360 | 600 | 720 |
| Catalyst 10/0.070 | — | 120 | 240 | 320 |
| Catalyst 10/0.070 | CAS 120-46-7/0.017 | 900 | 1320 | 1560 |
| Catalyst 11/0.075 | — | 60 | 180 | 300 |
| Catalyst 11/0.075 | CAS 1118-71-4/0.019 | 600 | 1020 | 1140 |
| Catalyst 12/0.075 | — | 80 | 120 | 140 |
| Catalyst 12/0.075 | CAS 18362-64-6/0.019 | 300 | 480 | 680 |
| Catalyst 15/0.075 | — | 60 | 120 | 170 |
| Catalyst 15/0.075 | CAS 13988-67-5/0.022 | 360 | 480 | 600 |
| Catalyst 23/0.087 | — | 90 | 150 | 170 |
| Catalyst 23/0.087 | CAS 18362-64-6/0.022 | 300 | 540 | 600 |

Example A 8

The testing samples are prepared by adding photolatent metal catalysts, 0.025% weight of metal and 1,3-diketones (ligands). to 7.52 g of component A1 of the basic testing formulation of example A1. The amount of ligand is adjusted to have the following weight ratios between the organometallic photolatent catalyst and the ligand: 70/30, 80/20 and 90/10.

After the mixture of the component A1 with 2 g of component B1, the mixtures are stored in the dark at room temperature. The potlife of each formulation is monitored by measuring the viscosity at 25° C. by means of a viscometer from Epprecht Instruments+Control AG. The measurements are done after the preparation of formulation and each hour until 7 h. The viscosity increases with the time. The lower the increase of the viscosity, the better is the potlife of the formulation and consequently the larger is the working window. The catalysts and ligands which are used in the experiment as well as results are presented in the following table 8.

TABLE 8

| Catalysts | Ratio | Viscosity at 25° C. (poises) | | | | | | | |
|---|---|---|---|---|---|---|---|---|---|
| | | 0 h | 1 h | 2 h | 3 h | 4 h | 5 h | 6 h | 7 h |
| Catalyst 3/Ligand 7 | 70/30 | 1.5 | 2.6 | 3.8 | 5.8 | 7.8 | 15 | 24 | 32 |
| Catalyst 3/Ligand 7 | 80/20 | 1.4 | 2.6 | 5.1 | 6.8 | 11.2 | 22 | 32 | gelled |
| Catalyst 3/Ligand 7 | 90/10 | 1.5 | 3.3 | 6.7 | 11.6 | 21 | gelled | gelled | gelled |
| Catalyst 3/Ligand 3 | 70/30 | 1.5 | 1.9 | 2.4 | 3.3 | 4 | 5.3 | 6.4 | 7.2 |
| Catalyst 3/Ligand 3 | 80/20 | 1.3 | 2.1 | 3.3 | 4.9 | 6.6 | 12 | 19 | 21 |
| Catalyst 3/Ligand 3 | 90/10 | 1.5 | 2.4 | 4.5 | 7 | 11.6 | 26 | 48 | gelled |
| Catalyst 18-without ligand | — | 1.6 | 3.1 | 5.8 | 7.7 | 15.2 | 40 | gelled | gelled |
| Catalyst 18/Ligand 3 | 70/30 | 1.3 | 1.9 | 2.3 | 2.6 | 3.2 | 3.5 | 4.5 | 5.5 |
| Catalyst 18/Ligand 3 | 80/20 | 1.5 | 2.2 | 2.6 | 3.9 | 4.6 | 5.4 | 7 | 11.2 |
| Catalyst 18/Ligand 3 | 90/10 | 1.6 | 2.4 | 3.5 | 4.7 | 6.8 | 8.4 | 11.6 | 19 |
| Catalyst 18/Ligand 7 | 70/30 | 1.4 | 2.2 | 2.7 | 3 | 3.8 | 4.3 | 6 | 7.7 |
| Catalyst 18/Ligand 7 | 80/20 | 1.6 | 2.4 | 3 | 3.8 | 5.1 | 6.4 | 8.6 | 11.2 |
| Catalyst 18/Ligand 7 | 90/10 | 1.6 | 2.5 | 4 | 5.1 | 6.8 | 8.6 | 14 | 19 |

TABLE 8-continued

| Catalysts | Ratio | \multicolumn{8}{c}{Viscosity at 25° C. (poises)} | | | | | | | |
|---|---|---|---|---|---|---|---|---|---|
| | | 0 h | 1 h | 2 h | 3 h | 4 h | 5 h | 6 h | 7 h |
| Catalyst 18/ CAS 1118-71-4 | 70/30 | 1.4 | 2.1 | 2.3 | 2.8 | 3.6 | 4.1 | 4.8 | 5.6 |
| Catalyst 18/ CAS 1118-71-4 | 80/20 | 1.6 | 2.2 | 2.7 | 3.4 | 4.4 | 5.6 | 7.6 | 8.2 |
| Catalyst 18/ CAS 1118-71-4 | 90/10 | 1.8 | 2.2 | 3.2 | 4.3 | 6.7 | 7.6 | 13.6 | 18 |
| Catalyst 24 without ligand | — | 1.6 | 4.1 | 8.6 | 14 | 36 | gelled | gelled | gelled |
| Catalyst 24/ Ligand 3 | 70/30 | 1.2 | 1.9 | 2.7 | 3.4 | 4 | 4.8 | 7 | 9.3 |
| Catalyst 24/ Ligand 3 | 80/20 | 1.3 | 2.2 | 3.1 | 4.2 | 5.9 | 8.2 | 11.4 | 19 |
| Catalyst 24/ Ligand 3 | 90/10 | 1.4 | 2.4 | 3.8 | 6.2 | 8 | 12 | 18 | 36 |
| Catalyst 24/ Ligand 7 | 70/30 | 1.3 | 1.9 | 2.6 | 3.1 | 3.7 | 4.6 | 6.1 | 8.5 |
| Catalyst 24/ Ligand 7 | 80/20 | 1.3 | 2.1 | 3.5 | 5.2 | 5.8 | 8.1 | 12.4 | 26 |
| Catalyst 24/ Ligand 7 | 90/10 | 1.4 | 2.3 | 3.9 | 6.4 | 9 | 14 | 24 | gelled |
| Catalyst 24/ CAS 1118-71-4 | 70/30 | 1.4 | 2 | 2.4 | 3.2 | 3.5 | 4.4 | 5.8 | 6.9 |
| Catalyst 24/ CAS 1118-71-4 | 80/20 | 1.4 | 2.1 | 2.8 | 4 | 5 | 6.4 | 8.2 | 12 |
| Catalyst 24/ CAS 1118-71-4 | 90/10 | 1.5 | 2.5 | 3.9 | 7 | 8.3 | 17 | 27 | gelled |

Example A 9

The testing samples are prepared by adding photolatent metal catalysts 0.025% weight of metal and 1,3-diketones (ligands) to 7.52 g of component A1 of the basic testing formulation of example A1. The amount of ligand is adjusted to have the following weight ratios between the organometallic photolatent catalyst and ligand: 70/30, 80/20 and 90/10.

After the mixture of the component A1 with 2 g of component B1, the mixtures are applied with a 76 μm split coater on two glass plates of 30 cm length. One plate is irradiated using a UV processor from IST Metz (mercury lamps, 2*100 m) at a belt speed of 5 m/min, whereas a second one is not irradiated. The reactivity of the mixtures is determined by measuring the "tack free time". Therefore the samples are set up on a drying recorder from ByK Gardner, where a needle is moving with a constant speed over the coated substrate for 24 h. The recording is carried out in the dark, at room temperature. The "tack free time" is the period of time needed for the sample to cure in such a manner that no tack is left on the surface upon touch of the needle in the recorder.

The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst.

The catalysts and ligands which are used in the test as well as the results are collected in the following table 9.

TABLE 9

| Catalysts | Ratio | Tack free time (stage 3/4) h | |
|---|---|---|---|
| | | No irradiation | 2*100 W 5 m/min |
| No catalyst | — | 13 | 14 |
| Catalyst 3/ Ligand 7 | 70/30 | 10 | 8.75 |
| Catalyst 3/ Ligand 7 | 80/20 | 11.25 | 6.25 |
| Catalyst 3/ Ligand 7 | 90/10 | 10.75 | 6 |
| Catalyst 3/ Ligand 3 | 70/30 | 11.5 | 10 |
| Catalyst 3/ Ligand 3 | 80/20 | 12.5 | 7 |
| Catalyst 3/ Ligand 3 | 90/10 | 10.25 | 7 |
| Catalyst 18- without ligand | — | 9.25 | 6.75 |
| Catalyst 18/ Ligand 3 | 70/30 | 15.25 | 10 |
| Catalyst 18/ Ligand 3 | 80/20 | 14.5 | 8 |
| Catalyst 18/ Ligand 3 | 90/10 | 12 | 8.5 |
| Catalyst 18/ Ligand 7 | 70/30 | 14 | 9 |
| Catalyst 18/ Ligand 7 | 80/20 | 14 | 8.25 |
| Catalyst 18/ Ligand 7 | 90/10 | 12.5 | 8.5 |
| Catalyst 18/ CAS 1118-71-4 | 70/30 | 14.5 | 8.5 |
| Catalyst 18/ CAS 1118-71-4 | 80/20 | 13 | 8.5 |
| Catalyst 18/ CAS 1118-71-4 | 90/10 | 12.5 | 8 |
| Catalyst 24 without ligand | — | 9.5 | 7 |
| Catalyst 24/ Ligand 3 | 70/30 | 15 | 8 |
| Catalyst 24/ Ligand 3 | 80/20 | 11.5 | 7.5 |

TABLE 9-continued

|  |  | Tack free time (stage 3/4) h | |
|---|---|---|---|
| Catalysts | Ratio | No irradiation | 2*100 W 5 m/min |
| Catalyst 24/Ligand 3 | 90/10 | 11 | 7.75 |
| Catalyst 24/Ligand 7 | 70/30 | 14 | 8 |
| Catalyst 24/Ligand 7 | 80/20 | 11.5 | 7 |
| Catalyst 24/Ligand 7 | 90/10 | 10 | 7.5 |
| Catalyst 24/CAS 1118-71-4 | 70/30 | 13.75 | 8.5 |
| Catalyst 24/CAS 1118-71-4 | 80/20 | 13 | 7.5 |
| Catalyst 24/CAS 1118-71-4 | 90/10 | 11.5 | 8 |

Example A10

The testing samples are prepared by adding photolatent catalysts 0.025% weight of metal on solid with and without addition of sensitizer (Darocur® benzophenone) to the two pack polyurethane formulation described in the example A1. The catalyst is first mixed in the component A1 and the component B1 is added just prior to the application.

The mixtures are applied with a 76 μm split coater on two glass plates of 30 cm length. One plate is irradiated using a UV processor from IST Metz (mercury lamps, 2*100 m) at a belt speed of 5 m/min, whereas a second one is not irradiated. The reactivity of the mixtures is determined by measuring the "tack free time". Therefore the samples are set up on a drying recorder from ByK Gardner, where a needle is moving with a constant speed over the coated substrate for 24 h. The recording is carried out in the dark, at room temperature. The "tack free time" is the period of time needed for the sample to cure in such a manner that no tack is left on the surface upon touch of the needle in the recorder.

The potlife of the formulation is visually monitored at room temperature. In fact, the time when the formulation is gelled in the flask, is determined.

The lower the value of the "tack free time", the faster is the reaction of the polyol with the isocyanate. The higher the difference between the value of the "tack free time" of the irradiated sample and the non-irradiated sample (with a tack free value of the irradiated sample, which is lower than the one of the non-irradiated one), the more "photolatent" is the catalyst.

The higher the value of potlife, the more stable is the mixture in the flask.

The catalysts which are used in the test as well as the results are collected in the following table 10.

TABLE 10

| | | | Tack free time (stage 3/4) h | |
|---|---|---|---|---|
| Catalyst | Darocur® Benzophenone | Potlife (h) | No irradiation | 2*100 W 5 m/min |
| Catalyst 21 | — | 6 < h < 7 | 11.5 | 5.5 |
| Catalyst 21 | 0.125% | 6 < h < 7 | 12 | 7.25 |
| Catalyst 22 | — | 6 < h < 7 | 12 | 6.25 |
| Catalyst 22 | 0.125% | 6 < h < 7 | 13.5 | 5.25 |
| Catalyst 20 | — | 3 < h < 4 | 10.5 | 3.25 |
| Catalyst 20 | 0.125% | 3 < h < 4 | 9.5 | 5 |

Example A11

Curing of 2 Pack Polyurethane Systems

Component A2

| 61 | parts of a polyol (Joncryl® 588; BASF SE) |
| 0.1 | parts of EFKA® 3031 |
| 0.9 | parts of EFKA® 3033 |
| 38 | parts of butylacetate |

Component B2

| 90 | parts of aliphatic polyisocyanate [(HDI-Trimer) Basonat ® HI100; BASF SE] |
| 10 | parts of butylacetate |

The basic testing formulation of the example A11 is composed of

| 32.9 | parts of component A2 |
| 9.6 | parts of component B2 |

Photolatent Metal Catalytic Solution 1:

The photolatent catalytic solution is composed by a mixture of catalyst 3 and ligand CAS 13988-67-5 (ratio 80/20) dissolved in 50% in butylacetate:

| 40 | parts of catalyst 3 |
| 10 | parts of CAS 13988-67-5 |
| 50 | parts of butylacetate |

The testing samples are prepared by adding different amounts of the photolatent metal catalytic solution to the two pack polyurethane formulation. The catalytic solution is first mixed in the component A2 and the component B2 is added just prior to the application.

The mixtures are applied with 100 μm draw down on three glass plates (38*7 cm). Two plates are irradiated by using a UV processor from IST Metz: One sample is exposed to Mercury lamp, 1*200 W/cm at a belt speed of 10 m/min, whereas a second sample is exposed to Gallium doped lamp, 1*200 W at a belt speed of 10 m/min.

The third panel is not irradiated.

The drying time of the mixture is determined by evaluating the surface cure and the through cure with to a sand test. The sand test equipment consists in funnels on wheels, which are filled by ca. 60-80 g of fine and calibrated sand grains. The funnels are moving with a constant speed over the coated substrates for 24 h. The recording is carried out at the daylight and at room temperature (23°+/−2° C.).

The time of surface cure corresponds to the time when the sand doesn't adhere anymore to the surface of coating.

The through cure is evaluated by monitoring the trace of the wheels on the coating film.

The coating is cured when there are no clear spoors any more.

The shorter the times of surface cure and through cure are, the faster the reaction of the polyol with the isocyanate is.

The higher the difference between the curing time of the irradiated sample and the non-irradiated sample, the more "photolatent" is the catalytic system.

The amounts of catalyst which are used in the test as well as the results are collected in the following tables 11a and 11b.

TABLE 11a

| | | Surface cure time (h) | | |
|---|---|---|---|---|
| | Catalyst amount | No UV | Mercury lamp | Gallium lamp |
| No catalyst | — | >19 | — | — |
| Catalytic solution 1 | 0.317 g | 8.5 | 0 | 0 |
| Catalytic solution 1 | 0.245 g | 8.5 | 0 | 0 |

TABLE 11b

| | | Throughcure (h) | | |
|---|---|---|---|---|
| | Catalyst amount | No UV | Mercury lamp | Gallium lamp |
| No catalyst | — | >19 | — | — |
| Catalytic solution1 | 0.317 g | 11.5 | 2.5 | 3 |
| Catalytic solution1 | 0.245 g | 11 | 5.5 | 3.5 |

Example A12

Curing of 2 Pack Polyurethane Systems

Component A3

| 28.5 | parts of a polyol (Joncryl ® 922; BASF SE) |
| 85.6 | parts of a polyol (Joncryl ® 507; BASF SE) |
| 0.45 | parts of EFKA ® 3030 |
| 1.5 | parts of Baysilonoil OL, 10% ig in Butylacetate |
| 7.65 | parts of 1,2-methoxypropylacetate |
| 26.25 | parts of butylacetate |

Component B3

| 100 | parts of aliphatic polyisocyanate [(HDI-Trimer) Basonat ® HI100; BASF SE] |

The basic testing formulation of the example A12 is composed of

| 30 | parts of component A3 |
| 8.73 | parts of component B3 |

Photolatent Metal Catalytic Solution 2:

| 50 | parts of catalyst 3 |
| 50 | parts of butylacetate |

The photolatent catalytic solution 2 is prepared by dissolution of the catalyst in butylacetate.

Photolatent Metal Catalytic Solution 3:

| 40 | parts of catalyst 3 |
| 10 | parts of CAS 13988-67-5 |
| 50 | parts of butylacetate |

The photolatent catalytic solution 3 is composed by a mixture of catalyst and ligand CAS 13988-67-5 (ratio 80/20) dissolved in butylacetate The testing samples are prepared by adding different amounts of the photolatent metal catalytic solution to the two pack polyurethane formulation. The catalytic solution is first mixed in the component A3 and the component B3 is added just prior to the application.

The mixtures are applied with 100 μm draw down on three glass plates (38*7 cm).

Two plates are irradiated by using a UV processor from IST Metz: One sample is exposed to Mercury lamp, 1*200 W/cm at a belt speeds of 10 m/min, whereas a second sample is exposed to Gallium doped lamp, 1*200 W at a belt speed of 10 m/min.

The third panel is not irradiated.

The drying time of the mixture is determined by evaluating the surface cure and the through cure with a sand test. The sand test equipment consists in funnels on wheels, which are filled by ca. 60-80 g of fine and calibrated sand grains. The funnels are moving with a constant speed over the coated substrates for 24 h. The recording is carried out at the daylight and at room temperature (23°+/−2° C.).

The time of surface cure corresponds to the time when the sand doesn't adhere anymore to the surface of coating. The through cure is evaluated by monitoring the trace of the wheels on the coating film. The coating is cured when there are no clear spoors any more. The shorter the times of surface cure and through cure are, the faster the reaction of the polyol with the isocyanate is.

The higher the difference between the curing time of the irradiated sample and the non-irradiated sample, the more "photolatent" is the catalytic system.

The gelled time of the formulation is determined by monitoring the capability of a spindle to move in a flask filled by the formulation. The recording is carried out at room temperature in a flask protected from light. The gelled time is the time when the spindle can not move anymore in the formulation. The longer the gelled time is, the more stable the formulation is.

The amounts of catalyst which are used in the test as well as the results are collected in the following tables 12a and 12b.

TABLE 12a

| Catalyst | Catalyst amount | Gelled time | Surface cure time (h) | | |
|---|---|---|---|---|---|
| | | | No UV | Mercury lamp | Gallium lamp |
| No catalyst | — | 14 h 55 | 13 | — | — |
| Catalytic solution 2 | 1.62 g | <15 min | <0.5 | 0 | 0 |
| Catalytic solution 3 | 0.81 g | 04 h 25 | 8 | 0 | 0 |

TABLE 12b

| Catalyst | Catalyst amount | Gelled time | Through cure time(h) | | |
|---|---|---|---|---|---|
| | | | No UV | Mercury lamp | Gallium lamp |
| No catalyst | — | 14 h 55 | 24 | — | — |
| Catalytic solution 2 | 1.62 g | <15 min | 3 | 0 | 0 |
| Catalytic solution 3 | 0.81 g | 04 h 25 | 8.5 | 3.5 | 3.5 |

Example A13

Influence of light stabilizers and light absorbers on the curing of 2 pack polyurethane systems:

Component A4

| | |
|---|---|
| 28.1 | parts of a polyol (Joncryl ® 922; BASF SE) |
| 84.4 | parts of a polyol (Joncryl ® 507; BASF SE) |
| 0.45 | parts of EFKA ® 3030 |
| 1.5 | parts of Baysilonoil OL, 10% ig in nutylacetate |
| 1.05 | parts of Tinuvin ® 292 (HALS- light stabilizer) provided by BASF SE |
| 1.11 | parts of Tinuvin ® 384-2 (UV absorber) provided by BASF SE |
| 7.65 | parts of 1,2-methoxypropylacetate |
| 25.89 | parts of butylacetate |

Component B4

| | |
|---|---|
| 100 | parts of aliphatic polyisocyanate [(HDI-Trimer) Basonat ® HI100; BASF SE] |

The basic testing formulation of the example A13 is composed of

| | |
|---|---|
| 30 | parts of component A4 |
| 8.73 | parts of component B4 |

Photolatent Metal Catalytic Solution 3:

| | |
|---|---|
| 40 | parts of catalyst 3 |
| 10 | parts of CAS 13988-67-5 |
| 50 | parts of butylacetate |

The photolatent catalytic solution 3 is composed by a mixture of catalyst and ligands CAS 13988-67-5 (ration 80/20) dissolved in butylacetate.

The testing samples are prepared by adding different amounts of the photolatent metal catalytic solution to the two pack polyurethane formulation. The catalytic solution is first mixed in the component A4 and the component B4 is added just prior to the application.

The mixtures are applied with 100 μm draw down on three glass plates (38*7 cm).

Two plates are irradiated by using a UV processor from IST Metz: One sample is exposed to Mercury lamp, 1*200 W/cm at a belt speeds of 10 m/min, whereas a second sample is exposed to Gallium doped lamp, 1*200 W at a belt speed of 10 m/min.

The third panel is not irradiated.

The drying time of the mixture is determined by evaluating the surface cure and the through cure with a sand test. The sand test equipment consists in funnels on wheels, which are filled by ca. 60-80 g of fine and calibrated sand grains. The funnels are moving with a constant speed over the coated substrates for 24 h. The recording is carried out at the daylight and at room temperature (23°+/−2° C.).

The time of surface cure corresponds to the time when the sand doesn't adhere anymore to the surface of coating. The through cure is evaluated by monitoring the trace of the wheels on the coating film. The coating is cured when there are no clear spoors any more. The shorter the times of surface cure and through cure are, the faster the reaction of the polyol with the isocyanate is. The higher the difference between the curing time of the irradiated sample and the non-irradiated sample, the more "photolatent" is the catalytic system.

The gelled time of the formulation is determined by monitoring the capability of a spindle to move in a flask filled by the formulation. The recorded is carried out at room temperature in a flask protected from light. The gelled time is the time when the spindle can not move anymore in the formulation. The longer the gelled time is, the more stable the formulation is.

The amounts of catalyst which are used in the test as well as the results are collected in the following tables 13a and 13b.

TABLE 13a

| Catalyst | Catalyst amount | Gelled time | Surface cure time (h) | | |
|---|---|---|---|---|---|
| | | | No UV | Mercury lamp | Gallium lamp |
| No catalyst | — | 13 h 48 | 16 | — | — |
| Catalytic solution 3 | 0.40 g | 04 h 22 | 8.5 | 3 | 2 |
| Catalytic solution 3 | 0.80 g | 04 h 49 | 9 | 3 | 2.5 |

TABLE 13b

| Catalyst | Catalyst amount | Gelled time | Through cure (h) | | |
|---|---|---|---|---|---|
| | | | No UV | Mercury lamp | Gallium lamp |
| No catalyst | — | 13 h 48 | 15.5 | — | — |
| Catalytic solution 3 | 0.40 g | 4 h 22 | 9 | 3.5 | 7 |
| Catalytic solution 3 | 0.80 g | 04 h 25 | 10 | 7 | 4 |

The invention claimed is:
1. Ti-chelate catalyst formulation comprising:
(i) 95-70% by weight of at least one compound selected from the group consisting of
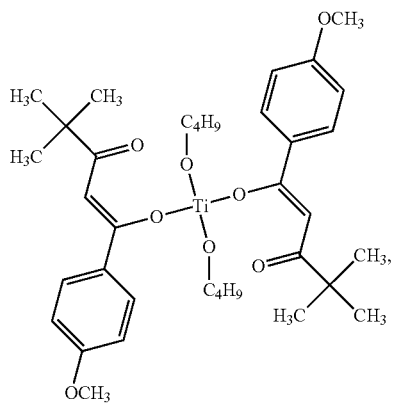
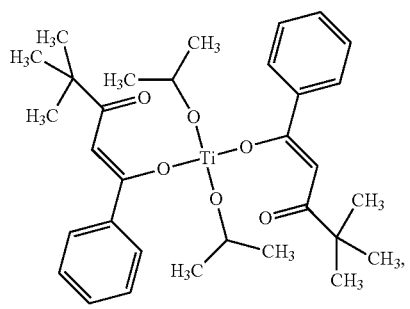
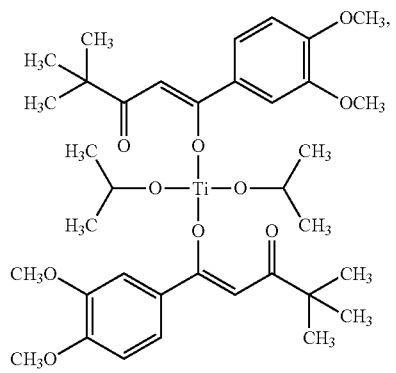
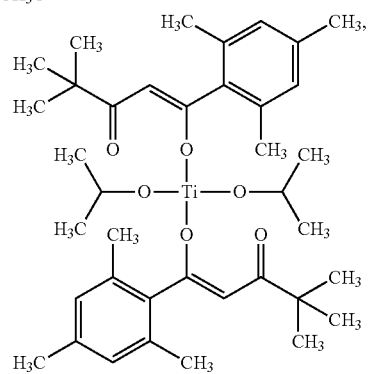
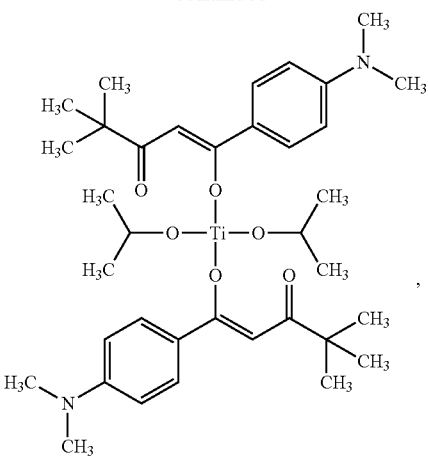
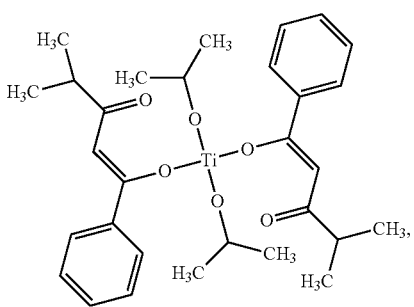
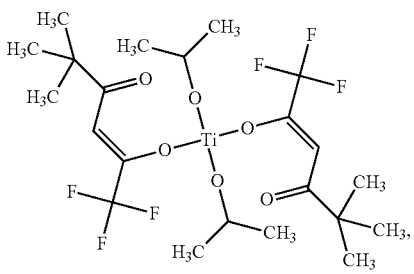
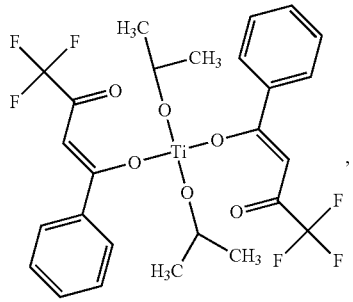
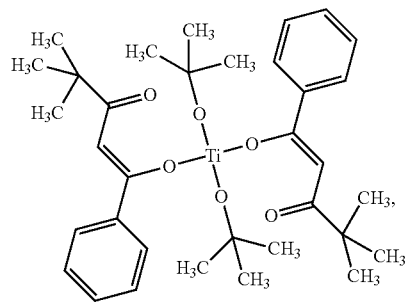

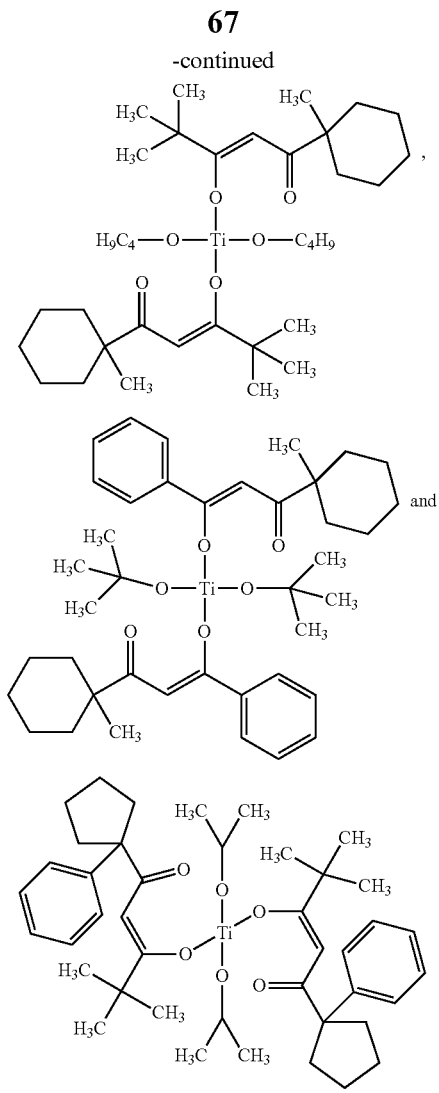

based on the total catalyst formulation; and (ii) at least one chelate ligand compound

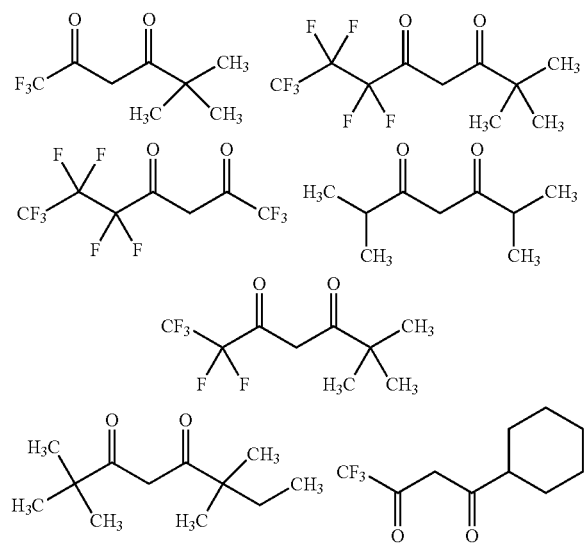

wherein 5-30% by weight of at least one chelate ligand is present based on the total catalyst formulation.

2. A polymerizable composition comprising
(a) at least one blocked or unblocked isocyanate or isothiocyanate component,
(b) at least one polyol; and
(c) at least one Ti-chelate catalyst formulation as defined in claim 1.

3. A polymerizable composition according to claim 2, comprising in addition to components (a), (b) and (c), (d) a photosensitizer compound.

4. A method of using the polymerizable composition according to claim 2 comprising: incorporating the polymerizable composition according to claim 2 in adhesives, coatings, sealings, potting components, printing inks, printing plates, foams, moulding compounds, or photostructured layers.

5. A coated substrate coated on at least one surface with a composition according to claim 2.

6. A polymerizable composition comprises
(a) at least one blocked or unblocked isocyanate or isothiocyanate component,
(b) at least one polyol; and
(c) at least one Ti-chelate catalyst formulation as defined in claim 1, which comprises 0.001 to 15% by weight of (c) based on the total composition.

7. A polymerizable composition according to claim 6 comprises 0.01 to 5% by weight of (c) based on the total composition.

8. A process for polymerizing compounds, which are capable to crosslink in the presence of a Lewis acid, characterized in that a Ti-chelate catalyst formulation as defined in claim 1 is added to said compounds and the resulting mixture is irradiated with electromagnetic radiation of a wavelength range of 200-800 nm.

9. A process according to claim 8, wherein the component which is capable to crosslink in the presence of a Lewis acid is a mixture of (a) a blocked or unblocked isocyanate or isothiocyanate component and (b) a polyol.

10. A process according to claim 8 for the preparation of adhesives, sealings, coatings, potting components, printing inks, printing plates, foams, moulding compounds, or photostructured layers.

11. A process for polymerizing compounds, which are capable to crosslink in the presence of a Lewis acid, characterized in that a Ti-chelate catalyst formulation as defined in claim 1 is added to said compounds and the resulting mixture is subjected to a heat treatment, or the mixture is irradiated with electromagnetic radiation of a wavelength range of 200-800 nm and simultaneously with or after the irradiation subjected to a heat treatment.

12. A Ti-chelate catalyst formulation comprising:

(i) at least one compound of the formula I

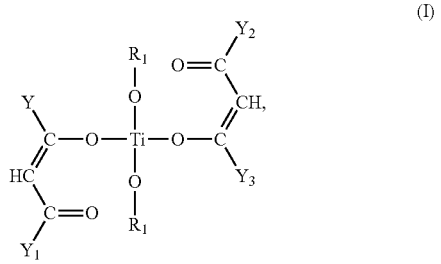

wherein $R_1$ is $C_1$-$C_8$alkyl or $C_2$-$C_{12}$alkyl, which is interrupted by 1-6 non-consecutive O-atoms;

Y is

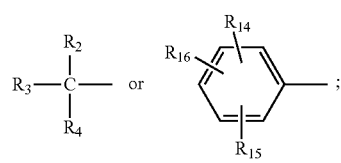

$Y_1$ is

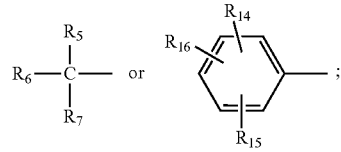

$Y_2$ is

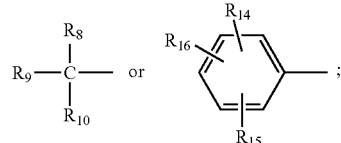

$Y_3$ is

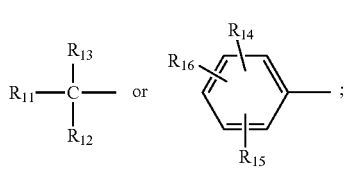

$R_2$, $R_3$, $R_4$, $R_5$, $R_6$, $R_7$, $R_8$, $R_9$, $R_{10}$, $R_{11}$, $R_{12}$ and $R_{13}$ independently of each other are hydrogen, halogen, phenyl or $C_1$-$C_4$alkyl, provided that only one of $R_2$, $R_3$, $R_4$ is hydrogen and only one of $R_5$, $R_6$, $R_7$ is hydrogen and only one of $R_5$, $R_9$, $R_{10}$ is hydrogen and only one of $R_{11}$, $R_{12}$, $R_{13}$ is hydrogen;

or $R_5$ and $R_6$, and/or $R_5$ and $R_9$, together with the C-atom to which they are attached form a 5 or 6 membered saturated ring, $R_{14}$, $R_{15}$ and $R_{16}$ independently of each other are hydrogen, $C_1$-$C_4$alkyl, $C_1$-$C_4$alkoxy, benzoyl, nitro or $NR_{17}R_{18}$;

or $R_{14}$ and $R_{15}$ together with the phenyl ring to which they are attached form thioxanthyl which is unsubstituted or is substituted by $C_1$-$C_4$alkyl;

$R_{17}$ and $R_{15}$ are $C_1$-$C_4$alkyl; and (ii) at least one chelate ligand compound

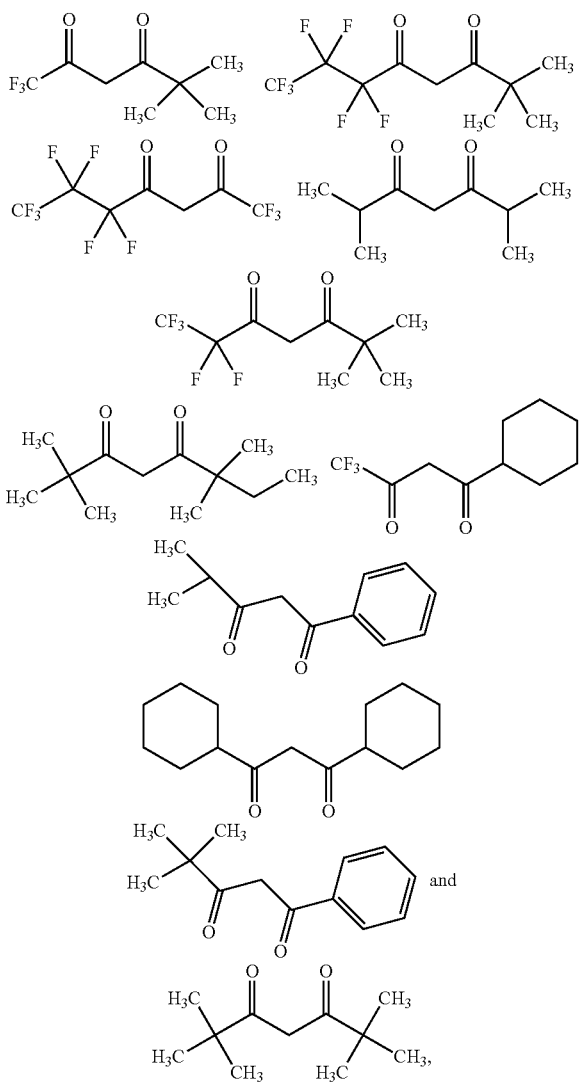

wherein (i) 95-70% by weight of at least one compound of the formula I, and (ii) 5-30% by weight of at least one chelate ligand compound are present based on the total catalyst formulation.

* * * * *

UNITED STATES PATENT AND TRADEMARK OFFICE
CERTIFICATE OF CORRECTION

PATENT NO. : 10,207,261 B2  
APPLICATION NO. : 13/395467  
DATED : February 19, 2019  
INVENTOR(S) : Tobias Hintermann et al.

Page 1 of 1

It is certified that error appears in the above-identified patent and that said Letters Patent is hereby corrected as shown below:

On the Title Page

Item (57), Line 19, "have on" should be -- have one --.

Item (57), Line 22, "have on" should be -- have one --.

In the Claims

At Column 70, Line 5, "$R_5$," should be -- $R_8$, --.

At Column 70, Line 8, "$R_5$" should be -- $R_8$ --.

At Column 70, Line 17, "$R_{15}$" should be -- $R_{18}$ --.

Signed and Sealed this  
Nineteenth Day of November, 2019

Andrei Iancu  
*Director of the United States Patent and Trademark Office*